United States Patent [19]

Ohshita

[11] Patent Number: 5,687,023
[45] Date of Patent: Nov. 11, 1997

[54] KEPLERIAN ZOOM FINDER OPTICAL SYSTEM

[75] Inventor: Koichi Ohshita, Tokyo, Japan

[73] Assignee: Nikon Corporation, Tokyo, Japan

[21] Appl. No.: 197,847

[22] Filed: Feb. 17, 1994

[30] Foreign Application Priority Data

Feb. 19, 1993 [JP] Japan ................................. 5-030463
Nov. 15, 1993 [JP] Japan ................................. 5-284992

[51] Int. Cl.$^6$ ............................ G02B 27/02; G02B 13/04; G02B 15/14; G02B 23/00
[52] U.S. Cl. ..................... 359/422; 359/432; 359/753; 359/676; 359/683; 359/686; 359/423; 354/219; 354/225
[58] Field of Search ........................... 359/686, 432, 359/422, 683, 615, 616, 781, 676, 761, 694, 753; 354/152, 199, 201, 162, 163, 164, 165, 166, 219, 220, 223, 222, 224, 225, 228, 781, 715, 747, 76

[56] References Cited

U.S. PATENT DOCUMENTS

| | | | |
|---|---|---|---|
| 3,438,689 | 4/1969 | Wehr | 359/432 |
| 3,532,416 | 10/1970 | Schmidt | 359/423 |
| 3,738,245 | 6/1973 | Theer | 359/424 |
| 4,249,793 | 2/1981 | Uehara | 359/422 |
| 4,842,395 | 6/1989 | Sato et al. | 359/432 |
| 5,132,833 | 7/1992 | Ohshita | 359/422 |
| 5,132,848 | 7/1992 | Nishio et al. | 359/686 |
| 5,144,480 | 9/1992 | Ohshita | 359/432 |
| 5,157,550 | 10/1992 | Tsuchida et al. | 359/686 |
| 5,173,806 | 12/1992 | Ogata | 359/683 |
| 5,241,337 | 8/1993 | Betensky et al. | 354/219 |
| 5,315,441 | 5/1994 | Hori et al. | 359/781 |
| 5,381,265 | 1/1995 | Ohshita | 359/422 |
| 5,448,411 | 9/1995 | Morooka | 354/225 |

FOREIGN PATENT DOCUMENTS

| | | | |
|---|---|---|---|
| 0095315 | 6/1983 | Japan | 359/686 |
| 0074524 | 4/1984 | Japan | 359/683 |
| 0296208 | 12/1990 | Japan | 359/675 |
| 473539 | 10/1937 | United Kingdom | 359/423 |
| 322460 | 12/1996 | United Kingdom | 359/423 |

Primary Examiner—Paul M. Dzierzynski
Assistant Examiner—Mohammad Y. Sikder
Attorney, Agent, or Firm—Shapiro and Shapiro

[57] ABSTRACT

A Keplerian zoom finder optical system comprises an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power. This finder also comprises a regulating element, disposed in the vicinity of a focal position of the objective lens group, for regulating a visual field. The finder further comprises an eyepiece unit having a positive refracting power. The finder varies a magnification by moving at least the second lens unit along an optical axis and satisfies the following condition:

$$-5 < f_3/f_w < -3$$

where $f_w$: the synthetic focal length of the first and second lens units in a minimum magnification state, and $f_3$: the focal length of the third lens unit.

28 Claims, 10 Drawing Sheets

KEPLERIAN ZOOM FINDER OPTICAL SYSTEM

BACKGROUND OF THE INVENTION

1. Field of the Invention

The present invention relates to a finder for use with a lens shutter camera.

2. Related Background Art

A Keplerian finder is constructed of an objective lens group having a positive refracting power and an eyepiece having a positive refracting power. In the Keplerian finder, a field frame or a reticle plate is arranged in the vicinity of a focal position of the objective lens group. With this arrangement, it is possible to clearly view a demarcator between visual fields and a variety of indications. The Keplerian finder is therefore adopted as a finder of a high-quality lens shutter. Further, in this Keplerian finder, an entrance pupil thereof exists inwardly of the finder or on an object side of the finder. Hence, a lens aperture of the objective lens group does not increase even when continuously varying a magnification of the finder or attaining a much wider angle of the finder. From this advantage, the Keplerian finder is broadly employed especially as a zoom finder. While on the other hand, the Keplerian finder exhibits the following defects. The Keplerian finder is constructed to view a real image formed by the objective lens group and the field frame or the reticle plate in enlargement through the eyepiece. Consequently, this leads to such a drawback that internal defects, flaws and dusts on the surface of the prism or the lens close to the reticle plate as well as those on the reticle plate are easy to become conspicuous. It can not be overlooked that this defect hinders a spread of the Keplerian finder.

The applicant identical with that of the present invention proposed an apparatus for solving the above problem of the foreign matters being seen inside the finder in U.S. Pat. Ser. No. 044,600 filed on Apr. 9, 1993 and U.S. Pat. No. 5,381,265. According to this proposal, an objective lens group closer to an object than a reticle plate is of a negative/positive/positive type. Widened are an air spacing between the reticle plate and a third lens unit and an air spacing between the reticle plate and an eyepiece. There was made an attempt to obviate the problem by taking this arrangement and satisfying various conditions. Then, according to this proposal, in a finder having a variable power ratio on the order of 2, down-sizing of the finder can be attained with a small number of lenses. In the case of increasing the variable power ratio, particularly if the variable power ratio exceeds 2.5, however, moving quantities of first and second lens units sharply increase with the above-mentioned arrangement. Besides, an aperture of each lens becomes large, and, therefore, the down-sizing of the finder is hard to attain.

SUMMARY OF THE INVENTION

Accordingly, it is a primary object of the present invention, which obviates the above problems, to provide a small-sized finder in which internal dusts and foreign matters of the finder are hard to see although it has a variable power ratio on the order of 2, especially 2.5 or larger.

According to a first invention of this application for obviating the above problem, there is provided a Keplerian zoom finder optical system comprising an objective lens group having a positive refracting power on the whole. The objective lens group is constructed of, in order from an object side, a first lens unit having a negative refracting power, a second lens unit having a positive refracting power, a third lens unit having a negative refracting power and a fourth lens unit having a positive refracting power. The finder also comprises a regulating unit having a field frame or a reticle plate disposed in the vicinity of a focal position of the objective lens group. The finder further comprises an eyepiece unit having a positive refracting power. The finder varies a magnification by moving at least the second lens unit. The finder is constructed to satisfy the following conditions:

$$-5 < f_3/f_w < -3 \quad (1)$$

$$0.1 < D_4/f_e < 0.3 \quad (2)$$

where $f_w$: the synthetic focal length of the first and second lens units in a minimum magnification state, $f_3$: the focal length of the third lens unit.

$f_e$: the focal length of the eyepiece unit, and $D_4$: the distance on the optical axis from an eye-point-side surface of the fourth lens unit to the field frame or the reticle.

Further, a desirable construction is such that when varying the magnification from low to high, the first and second lens units relatively move on the optical axis to narrow an air spacing between these two lens units; and the third and fourth lens units are fixed. Besides, the finder includes the reticle plate composed of a parallel plane flat plate and is desirably constructed to further satisfy the following conditions:

$$-1.7 < f_1/f_w < -1.3 \quad (3)$$

$$-0.9 < f_2/f_1 < -0.8 \quad (4)$$

$$-0.7 < f_4/f_3 < -0.5 \quad (5)$$

where $f_1$: the focal length of the first lens unit, $f_2$: the focal length of the second lens unit, and $f_4$: the focal length of the fourth lens unit.

According to a second invention of this application, there is provided a Keplerian zoom finder optical system comprising an objective lens group having a positive refracting power on the whole. The objective lens group is constructed of a first lens unit having a negative refracting power, a second lens unit having a positive refracting power, a third lens unit having a negative refracting power and a fourth lens unit having a positive refracting power. The finder also comprises a regulating unit having a reticle plate composed of a parallel plane flat plate disposed in the vicinity of a focal position of the objective lens group and an eyepiece unit having a positive refracting power. This finder has a finder optical system in which at least the second lens unit moves on the optical axis to vary the magnification. A first mirror is disposed in an air spacing between the third lens unit and the fourth lens unit. A prism having two reflecting surfaces is disposed between the reticle plate and the eyepiece unit or disposed in the eyepiece unit. A mirror is disposed in an air spacing between the prism and the reticle plate. The finder is constructed to make a finder image erect with the aid of these four reflecting surfaces and desirably further satisfies the following conditions:

$$1.0 < D_3/f_w < 1.8 \quad (6)$$

$$0.1 < D_4/f_e < 0.3 \quad (2)$$

$$0.3 < D_e / f_e < 0.5 \quad (7)$$

where

- $D_3$: the distance on the optical axis from the eye-point-side surface of the third lens unit to the object-side surface of the fourth lens unit in the minimum magnification state,
- $D_4$: the distance on the optical axis from the eye-point-side surface of the fourth lens unit to the object-side surface of the reticle plate, and
- $D_e$: the distance on the optical axis from an eye-point-side surface of the reticle plate to a plane of incidence of the prism.

FIGS. 1A–1C illustrate configurations of the finder according to the first and second inventions. Shown therein is the objective lens group constructed of the first lens unit $G_1$ having the negative refracting power, the second lens unit $G_2$ having the positive refracting power, the third lens unit $G_3$ having the negative refracting power and the fourth lens unit $G_4$ having the positive refracting power. There are also shown the reticle plate or the field frame located in the vicinity of the focal point of the objective lens group and the eyepiece unit E, having the positive refracting power, for viewing the object image in enlargement which is formed by the objective lens group.

In the objective lens group of this invention, the first and second lens units $G_1$, $G_2$ always have the positive refracting power as a synthetic refracting power. The first and second lens units constitute a zoom object unit for varying a focal length through a movement of mainly the second lens unit $G_2$. Then, the third and fourth lens units $G_3$, $G_4$ are synthesized to incorporate a so-called rear converter function to vary the focal length of the zoom object unit composed of the first and second lens units $G_1$, $G_2$. This synthesized lens unit also incorporates a function to correct aberrations which can not be completely corrected by the zoom object unit. The synthesized lens unit further incorporates a function in the form of a field lens for guiding beams of incident light on the finder to a proper eye point position in combination with the above functions.

The conventional field lens is constructed of only positive lenses and exhibits nothing but, so to speak, a passive effect of guiding the beams of light to the eye point position. According to the present invention, the negative and positive lenses are arranged at intervals, thereby obtaining the above-mentioned composite functions. The following effects are exhibited.

To start with, a position of synthetic principal point of the third and fourth lens units $G_3$, $G_4$ can be set on the eye point side of the fourth lens unit $G_4$. Hence, even when the fourth lens unit $G_4$ is disposed apart from a focal position of the whole objective lens group, there is no possibility in which the effect as the field lens is lost. Further, the position of the synthetic principal point of the third and fourth lens units $G_3$, $G_4$ can be set closer to the eye point than the focal position of the above zoom object unit. Therefore, the third and fourth lens units $G_3$, $G_4$, although the synthetic focal length of the third and fourth lens units $G_3$, $G_4$ is positive, function as the rear converter for extending the synthetic focal length of the first and second lens units $G_1$, $G_2$. It is therefore possible to further shorten the focal length of the first and second lens units $G_1$, $G_2$ without varying the focal length of the objective lens group as a whole. The moving quantity of the movable lens units can be remarkably reduced. As explained above, restraining the moving quantity of the movable lens units down to a small value is advantageous in terms of down-sizing. In addition, this exhibits an effect in restraining fluctuations in the eye point position when varying the magnification.

Furthermore, in the objective lens group of a conventional negative/positive/positive three lens unit type, when increasing the variable power ratio, it is difficult to correct a barrel-shape distortion and a chromatic aberration of magnification at a wide-angle end. In the negative/positive/negative/positive four lens unit type of the present invention, however, the third negative lens unit $G_3$ is capable of offsetting the distortion and the chromatic aberration of magnification that are produced chiefly in the first lens unit $G_1$. The aberrations can be corrected more satisfactorily. In other words, it can be said that the present invention exhibits such a constructive characteristic that the third and fourth lens units $G_3$, $G_4$ have a synthetic magnification of 1× or greater. As a matter of course, however, there is a limit in terms of increasing the synthetic magnification of the third and fourth lens units $G_3$, $G_4$.

For instance, if the magnification thereof is increased, the focal length of the first and second lens units $G_1$, $G_2$ have to be reduced. However, a necessary aperture of exit pupil has to be also ensured. For this reason, a synthetic aperture ratio of the first and second lens units $G_1$, $G_2$ becomes large. A spherical aberration among the various aberrations is undesirably hard to correct.

Therefore, the synthetic magnification of the third and fourth lens units $G_3$, $G_4$ is set desirably within 1.3×. The conditional expression (1) prescribes the above-mentioned.

If under a lower limit of this conditional expression (1), the effect of the third lens unit $G_3$ decreases, and it follows that the above-mentioned effects of the present invention are not utilized. Whereas if above an upper limit thereof, the refracting power of each lens unit inevitably increases, and hence the various aberrations are hard to correct. It is difficult to configure each lens unit with a simple lens construction. This in turn brings about a scale-up of the optical system.

Further, in the case of the objective lens constructed of the above four lens units, a zooming system for varying the focal length, it can be considered, involves movements of the first and second lens units and movements of the second and third lens units. It is, however, desirable to take such a construction as to perform zooming by moving the first and second lens units in terms of restraining fluctuations in astigmatism as well as in pupil position.

Next, a reticle plate or a field frame A is disposed in the vicinity of the focal position of the objective lens group at a spacing from the fourth lens unit $G_4$ of the objective lens group. The reticle plate or the field frame A serves to indicate various kinds of information required for a photographic range and photography. The field frame termed herein is constructed of a thin plate such as a metal or the like and designates a so-called field stop. The reticle plate represents an information indicating member formed on a transparent base.

The present invention is concerned with the finder and is therefore required to include at least one of them. A variety of information such as an autofocus area and a photometric range as well as the photographic range can be displayed. Hence, it is desirable to take a construction including the reticle plate.

In this case, the finder may adopt a configuration having both of the reticle plate and the field frame. The finder may also take such a configuration that the photographic range is print-inscribed on the reticle plate, but the field frame is eliminated.

Further, the reticle plate is desirably composed of a parallel plane flat plate. The following are the reasons for this. Costs are less than by configuring the reticle plate on the lens. Besides, the finder can be constructed thin in terms of the optical system. An influence by bubble foreign matters can be restrained.

Then, the conditional expression (2) prescribes a spacing between the fourth lens unit $G_4$ and the reticle plate A. If under a lower limit thereof, the spacing between the fourth lens unit $G_4$ and the reticle plate A is too narrow. Dusts on the fourth lens unit $G_4$ and internal foreign matters therein are easy to become conspicuous. Whereas if above an upper limit thereof, the position of synthetic principal point of the third and fourth lens units $G_3$, $G_4$ is closer to the object than the synthetic focal position of the first and second lens units $G_1$, $G_2$. Consequently, there disappears the effect of the third and fourth lens units $G_3$, $G_4$ as the rear converter. This undesirably induces the scale-up of the optical system.

By the way, the eyepiece unit is intended to view the object image formed through the objective lens group and the reticle plate in enlargement while being overlapped with each other.

Then, it is desirable that the present invention further satisfies the following conditions in terms of construction.

The conditional expression (3) prescribes the focal length of the first lens unit $G_1$. If in excess of an upper limit thereof, a total length in a maximum magnification state is larger than that in a minimum magnification state. Whereas if under a lower limit thereof, the total length in the minimum magnification state increases, resulting in an obstacle against down-sizing of the finder.

The conditional expression (4) prescribes the focal length of the second lens unit $G_2$. If above an upper limit thereof, the first and second lens units $G_1$, $G_2$ impinge on each other in the maximum magnification state. The lens units interfere with each other. It is therefore difficult to ensure a variable power ratio on the order of 2.5. Whereas if under a lower limit thereof, the moving quantity of the second lens unit $G_2$ increases enough to inevitably bring about an increment in the total length.

The conditional expression (5) prescribes the focal length of the fourth lens unit $G_4$. Whether above its upper limit or under its lower limit, an off-axis beam can not be led to a proper eye point position. Accordingly, this conditional range is preferable.

With this construction of the present invention, the finder image has to be erected to actually provide a configuration incorporating the finder function. Known methods of erecting the image involve the use of a relay lens and the use of a prism and a mirror. Of those methods, the method using the relay lens bears a difficulty of attaining both of the down-sizing of the whole finder and the correction of aberrations. In general, the number of lenses constituting the optical system inevitably increases. Hence, in the case of the present invention aiming at the down-sizing of the finder, the desirable finder involves the use of the mirrors and the prism.

By the way, the prism built in this type of finder optical system generally uses plastic. It is because manufacturing the prism by the plastic molding is more advantageous in terms of costs than by manufacturing it with a polished glass material. The plastic molding generally, however, involves a sharp increase in the difficulty of molding with a larger cubage and thickness. This causes a rise in the costs. Accordingly, the cost for the prism even by manufacturing based on the plastic molding is several times as large as that for the lens.

On the other hand, the mirror is constructed simply by depositing a metallic material such as aluminum, etc. on the glass surface. The mirror has such a merit that a unit price of the parts is cheaper than the prism. A reflectivity thereof is, however, as low as approximately 90%. The finder becomes slightly dark, and the light path having a large length is needed. The defect is therefore such that both of the down-sizing and a higher magnification are hard to attain.

Under such circumstances, the second invention of this application aims at obtaining a small-sized and low-cost finder by laying out the prism and the mirror in a proper combination. To be specific, sequentially from the object side, a mirror M1 is disposed between the third and fourth lens units $G_3$, $G_4$, thus giving a first reflecting surface. It is desirable for obtaining the above-described effect of the third and fourth lens units $G_3$, $G_4$ to extend an air spacing between the third and fourth lens units $G_3$, $G_4$. With this layout, the air spacing between the two lens units can be extended, whereby the mirror can be disposed without any overeffort. FIG. 2 is a view illustrating a development light path with an omission of the reflecting surfaces of the optical systems of FIGS. 1A–1C. Turning to FIG. 2, an angle of each beam to the optical axis between the third and fourth lens units $G_3$, $G_4$ is comparatively large. It can be understood that the plastic prism having a low refractive index is hard to perform a total reflection of all of the beams without any leakage. Hence, the layout adopted is that the mirror M1 is disposed between the third and fourth lens units $G_3$, $G_4$.

Further, according to the present invention, three reflecting surfaces are located closer to a pupil side than the reticle plate. Referring to FIG. 2, an angle, made by the optical axis, of the beam passing between the reticle plate and the eyepiece unit is small. The total reflection can be therefore done efficiently by use of the prism. If even a plane closest to the reticle plate is shaped by the prism, however, the dusts and foreign matters on the incident plane of the prism and in the prism are undesirably conspicuously seen. Then, according to the present invention, the reflecting surface closest to the reticle plate is configured by a mirror M2. The last two reflecting surfaces are configured by a prism P.

Based on the configurations of such reflecting surfaces, the internal foreign matters are not conspicuous when viewing through the finder. Besides, the cubage of the prism can be, as shown in FIGS. 1A–1C, reduced. It is therefore possible to obtain a comparatively low-cost, high-powered and small-sized finder.

Then, according to the second invention in the present application, when configuring such an erecting system, it is desirable to satisfy the conditional expressions (6), (2) and (7).

The conditional expression (2) goes as explained above. The conditional expression (6) is associated with the air spacing between the third and fourth lens units $G_3$, $G_4$.

If under a lower limit of the conditional expression (6), the spacing between the two lens units is too narrow, with the result that the mirror is disposed with a difficulty. The effect of the third lens unit $G_3$ is not exhibited unless the refracting powers of the third and fourth lens units $G_3$, $G_4$ are increased. This inevitably results in a failure of correcting the various aberrations or an increase in the total length. Whereas if over an upper limit thereof, the spacing between the two lens units extends with a futility. This undesirably leads to the increase in the total length.

The conditional expression (7) prescribes an on-axis air spacing from the reticle plate to the incident plane of the prism. If under a lower limit thereof, the above spacing is not enough to dispose the mirror. Whereas if above an upper limit, the above spacing is excessively large, which undesirably induces a decrease in the finder magnification.

Further, in the finder according to this invention, the first lens unit $G_1$ is constructed of a biconcave single lens. The second lens unit $G_2$ is constructed of two biconvex lenses. The third lens unit $G_3$ is composed of a negative single lens. The fourth lens unit $G_4$ is composed of a biconvex single lens. An eye-point-side surface of the biconvex single lens of the first lens unit $G_1$ is an aspherical surface. An object-side surface of the biconvex single lens of the fourth lens unit $G_4$ is also an aspherical surface. Further, it is desirable to satisfy the following conditions in terms of correcting the various aberrations.

The aspherical surface is expressed such as:

$$S(y)=(y^2/R)/\{1+(1-k \times y^2/R^2)^{1/2}\}+C_2 \times y^2+C_4 \times y^4+ C_6 \times y^6+C_8 \times y^8+C_{10} \times y^{10}+ \quad (a)$$

where y is the height in a direction perpendicular to the optical axis, $S(y)$ is the quantity of shift in the optical-axis direction at the height y, R is the fiducial radius of curvature, k is the conical coefficient, and $C_n$ is the nth-order aspherical surface coefficient.

The paraxial curvature radius r of this aspherical surface is defined such as:

$$r=1/(2 \cdot C_2+1/R) \quad (b)$$

$$-1.1<r_2/r_1<-0.5 \quad (8)$$

$$-0.9<r_3/r_4<-0.4 \quad (9)$$

$$-0.4<r_9/r_{10}<-0.1 \quad (10)$$

$$15<v_2-v_1<30 \quad (11)$$

$$15<v_2-v_4<30 \quad (12)$$

$$0.028<S_2/r_2<0.031 \quad (13)$$

$$0.02<S_3/r_3<0.03 \quad (14)$$

$$0.03<S_9/r_9<0.031 \quad (15)$$

where $r_1$: the curvature radius of an object-side surface of the first lens unit $G_1$, $r_2$: the paraxial curvature radius of an eye-point-side surface of the first lens unit $G_1$, $r_3$: the paraxial curvature radius of an object-side surface of a lens, disposed on the object side, of the second lens unit $G_2$, $r_4$: the curvature radius of an eye-point-side surface of the lens, disposed on the object side, of the second lens unit $G_2$, $r_9$: the paraxial curvature radius of an object-side surface of the fourth lens unit $G_4$, and $r_{10}$: the curvature of radius of an eye-point-side surface of the fourth lens unit $G_4$.

$v_1$: the Abbe number of the first lens unit $G_1$, $v_2$: the Abbe number of the second lens unit $G_2$, $v_4$: the Abbe number of the third lens unit $G_3$, $S_2$: the quantity of shift of an eye-point-side aspherical surface of the first lens unit $G_1$ in the optical-axis direction when the height $y=0.25 \cdot r_2$, $S_3$: the quantity of shift of a closest-to-the-object surface in the second lens unit $G_2$ in the optical-axis direction when the height $y=0.25 \cdot r_3$, $S_9$: the quantity of shift of an object-side aspherical surface of the fourth lens unit $G_4$ in the optical-axis direction when the height $y=0.25 \cdot r_9$.

The conditional expression (8) is concerned with corrections of the distortion and a coma. If over an upper limit thereof, the coma in the maximum magnification state is hard to correct. Whereas if under a lower limit, a negative distortion in the minimum magnification state is corrected with a difficulty.

The conditional expression (9) is associated with a correction of astigmatism. If over its upper limit or under its lower limit, it is difficult to correct the astigmatism well.

The conditional expression (10) is related to fluctuations in the distortion. If over an upper limit thereof, the distortion fluctuates tremendously both in the maximum magnification state and in the minimum magnification state. Whereas if under a lower limit thereof, the fluctuations become small. The negative distortion in the minimum magnification state is, however, undesirably remarkably large.

The conditional expression (11) is associated with a correction of the on-axis chromatic aberration. If under its lower limit, the on-axis chromatic aberration becomes tremendous, resulting in a deficiency of correction. If over an upper limit, it is difficult to correct the fluctuations in the chromatic aberration of magnification even in consideration of the following conditional expression (12).

The conditional expression (12) gives a condition for correcting the chromatic aberration of magnification well in a state where the conditional expression (11) is satisfied. If under its lower limit, the chromatic aberration of magnification in the minimum magnification state increases. Whereas if over an upper limit, the chromatic aberration in the maximum magnification state becomes undesirably large.

The conditional expression (13) is related to an acceptable correction of the distortion. If above its upper limit, the effect of the aspherical surface is too small to correct the distortion well. Whereas if under a lower limit, this is advantageous to the correction of the distortion. It is, however, impossible to take a balance of the coma and the spherical aberration.

The conditional expression (14) is associated with the correction of the spherical aberration. If above its upper limit or under its lower limit, it is difficult to correct the spherical aberration well.

The conditional expression (15) is concerned with the spherical aberration of the pupil. If in excess of an upper limit thereof, this conduces to a deficiency of correction of the pupil's spherical aberration. Whereas if under a lower limit thereof, this leads to an overcorrection. Vignetting of the visual field and a ghost on a prism edge surface are undesirably easy to become conspicuous.

The finder according to a third invention of this application comprises an objective lens group having a positive refracting power on the whole. The objective lens group is constructed of, sequentially from the object side, a first lens unit composed of a biconcave negative lens with its aspherical surface toward an object, a second lens unit composed of a biconvex positive lens with its aspherical surface toward the object, a third lens unit having a negative refracting power and a fourth lens unit composed of a biconvex positive lens. The finder also comprises a field plate or a reticle plate disposed in the vicinity of a focal point of the objective lens group. The finder further comprises an eyepiece unit having a positive refracting power. The finder varies the magnification by moving at least the second lens unit along the optical axis and is constructed to satisfy the following conditions:

$$-5<f_3/f_w<-3 \quad (21)$$

$$0.1<D_4/f_e<0.3 \quad (22)$$

$$-2 < r_{12}/r_{11} < -1.1 \qquad (23)$$

$$-1.5 < r_{13}/r_{14} < -1 \qquad (24)$$

where $r_{11}$: the paraxial curvature radius of an object-side surface of the first lens unit, $r_{12}$: the curvature radius of an eye-point-side surface of the first lens unit, $r_{13}$: the paraxial curvature radius of an object-side surface of the second lens unit, and $r_{14}$: the curvature radius of an eye-point-side surface of the second lens unit.

Then, the above finder is capable of varying the magnification by moving the first and second lens units of the objective lens group.

Further, the finder optical system includes the reticle plate composed of a parallel plane flat plate. The first mirror is disposed in an air spacing between the third and fourth lens units. The prism having two reflecting surfaces is disposed between the reticle plate and the eyepiece unit or disposed in the eyepiece unit. Besides, the second mirror is disposed in an air spacing between the prism and the reticle plate. It is satisfactory to take a construction in which the finder image is erected by four reflecting surfaces.

Moreover, when erecting the image as described above, it is desirable to satisfy the following conditions:

$$1.0 < D_3/f_w < 1.4 \qquad (25)$$

$$0.1 < D_4/f_e < 0.3 \qquad (22)$$

$$0.3 < D_e/f < 0.5 \qquad (26)$$

More preferably, it is desirable to further satisfy the following conditions:

$$-1.4 < f_1/f_w < -1.2 \qquad (27)$$

$$-0.8 < f_2/f_1 < -0.6 \qquad (28)$$

$$-0.5 < f_4/f_3 < -0.44 \qquad (29)$$

FIG. 3 is a perspective view illustrating a construction of the finder according to the third invention.

The finder of the present invention comprises an objective lens group. The objective lens group is constructed of a first lens unit $G_1$ with its aspherical surface toward an object, a second lens unit $G_2$ similarly with its aspherical surface toward the object, a negative third lens unit $G_3$ and a fourth lens unit $G_4$ composed of a biconvex lens. The finder also comprises a reticle A or a field frame disposed in close proximity to a focal point thereof. The finder further comprises an eyepiece unit E, having a positive refracting power, for viewing an object image formed by the objective lens group in enlargement.

The first and second lens units $G_1$, $G_2$ are synthesized to have a positive refracting power all the time. The first and second lens unit $G_1$, $G_2$ constitute a zoom object unit for changing a focal length with a movement mainly of the second lens unit $G_2$. Then, the third and fourth lens units $G_3$, $G_4$ are synthesized to incorporate a so-called rear converter function to change the focal length of the zoom object unit configured by the first and second lens units $G_1$, $G_2$. The synthesized lens unit also incorporates a function to correct aberrations which can not be completely corrected by the zoom object unit. The synthesized lens unit further incorporates a function as a field lens for guiding the beams of incident light on the finder to a proper eye point position.

It is desirable that a magnification of the synthesization of the third and fourth lens units $G_1$, $G_4$ be restrained to 1.3× or smaller. A condition for prescribing this is given in the conditional expression (21).

The conditional expression (22) gives a condition for prescribing a spacing between the fourth lens unit $G_4$ and the reticle plate A.

According to the present invention, the respective lens units configuring the objective lens group are constructed of the single lenses. Each lens unit therefore has to be formed in an adequate shape for obtaining a good result of the correction. Then, conditions for prescribing the shapes are provided in the conditional expressions (23) and (24) because of the necessity for properly selecting shapes of the first and second lens units.

The conditional expression (23) provides a condition related to the corrections of the distortion and the comma.

The conditional expression (24) gives a condition associated with the corrections of the astigmatism and the spherical aberration.

If over its upper limit, the spherical aberration is hard to correct. Whereas if under a lower limit thereof, the astigmatism is undesirably hard to correct.

Based on the construction of the present invention discussed above, more preferably, it is desirable to satisfy one of the conditional expressions (27), (28) and (29).

The conditional expression (27) provides a condition for prescribing a focal length of the first lens unit $G_1$. If in excess of its upper limit, the total length in the maximum magnification state is larger than that in the minimum magnification state. Whereas if under a lower limit thereof, the total length in the minimum magnification state increases, resulting in an obstacle against the down-sizing of the finder.

The conditional expression (28) prescribes a focal length of the second lens unit $G_2$. If above an upper limit thereof, the first and second lens units $G_1$, $G_2$ interfere with each other in the maximum magnification state. It is therefore difficult to ensure a variable power ratio. If under a lower limit, the moving quantity of the second lens unit $G_2$ augments, and hence the total length inevitably increases.

The conditional expression (29) prescribes a focal length of the fourth lens unit $G_4$. If above an upper limit or under a lower limit, the off-axis beams can not be guided to a proper eye point position.

Further, when constituting the above-described erecting system, it is desirable that the conditional expressions (25), (22) and (26) be met.

The conditional expression (22) goes as explained above. The conditional expression (25) is related to an air spacing between the third and fourth lens units $G_3$, $G_4$.

If under a lower limit of the conditional expression (25), the spacing between the two lens units is too narrow, whereby the mirror is hard to dispose. Further, the effect of the third lens unit $G_3$ is not exhibited unless the refracting power of the fourth lens unit $G_4$ augments. Consequently, a failure of the corrections of the various aberrations is induced, or alternatively, the total length inevitably increases. Whereas if above an upper limit, it follows that the spacing extends with a futility. This undesirably leads to the increase in the total length.

The conditional expression (27) prescribes an on-axis air spacing from the reticle to the incident plane of the prism. If under a lower limit thereof, the above spacing is not enough to dispose the mirror. If above an upper limit, the spacing is too large, resulting in an undesirable drop in the finder magnification.

Furthermore, in the finder of the present invention having the above construction, it is desirable for correcting the variety of aberrations well that an object-side surface of the fourth lens unit $G_4$ be aspherical.

It is also desirable to satisfy at least one of conditional expressions which follow:

$$-0.6 < r_{17}/r_{18} < -0.2 \quad (30)$$

$$15 < v_2 - v_1 < 30 \quad (31)$$

$$15 < v_2 - v_3 < 30 \quad (32)$$

$$0.028 < S11/r_{11} < 0.031 \quad (33)$$

$$0.02 < S13/r_{13} < 0.03 \quad (34)$$

$$0.03 < S17/r_{17} < 0.031 \quad (35)$$

The aspherical surface described above is expressed in the formula (a). Further, when the paraxial curvature radius is defined by the above-mentioned formula (b), the following is given.

$r_{17}$: the paraxial curvature radius of an object-side surface of the fourth lens unit $G_4$, $r_{18}$: the curvature radius of an eye-point-side surface of the fourth lens unit $G_4$, $v_1$: the Abbe number of the first lens unit $G_1$, conditional expression (32), and when exceeding an upper limit thereof, the correction becomes difficult.

The conditional expression (32) gives a condition for correcting the chromatic aberration of magnification well in a state where the conditional expression (31) is met.

If under a lower limit thereof, the chromatic aberration of magnification in the minimum magnification state is largely produced. Whereas if above an upper limit, the chromatic aberration of magnification in the maximum magnification state is caused undesirably largely.

The conditional expression (33) provides a condition associated with a further well-performed correction of the distortion. If above an upper limit thereof, the effect of the aspherical surface is too small. It is consequently difficult to correct the distortion well. Whereas if under a lower limit, it is undesirably impossible to, though advantageous to the correction of the distortion, take a balance of the coma and the spherical aberration.

The conditional expression (34) gives a condition relative to the correction of the spherical aberration. If not within this range of conditions, it is undesirably difficult to correct the spherical aberration well.

The conditional expression (35) gives a condition associated with the spherical aberration of the pupil. If above an upper limit, the pupil's spherical aberration is brought into an undercorrected state. Whereas if in $v_2$: the Abbe number of the second lens unit $G_2$, $v_3$: the Abbe number of the third lens unit $S11$: the quantity of shift of an object-side aspherical surface of the first lens unit $G_1$ in the optical-axis direction when the height $y=0.25 \cdot r_{11}$, $S13$: the quantity of shift of an object-side aspherical surface of the second lens unit $G_2$ in the optical-axis direction when the height $y=0.25 \cdot r_{13}$, and $S17$: the quantity of shift of an object-side aspherical surface of the fourth lens unit $G_4$ in the optical-axis direction when the height $y=0.25 \cdot r_{17}$.

The conditional expression (30) gives a condition related to the correction of the distortion. If above an upper limit thereof, the distortion in the maximum and minimum magnification states tremendously fluctuates. Whereas if under a lower limit thereof, the fluctuations in the distortion become small. However, a negative distortion in the minimum magnification state is undesirably tremendously caused.

The conditional expression (31) provides a condition associated with the correction of the on-axis chromatic aberration. If under a lower limit, the correction of the on-axis chromatic aberration becomes enormous in amount, resulting in a deficiency of the correction. Whereas if above an upper limit, the chromatic aberration of magnification tremendously fluctuates and is therefore hard to correct. Even when in view of excess of a lower limit, this leads to an overcorrected state. Hence, the vignetting of the visual field and the ghost on the prism edge surface are easy to undesirably become conspicuous. Accordingly, this range of conditions is desirable.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be described.

Figure 1A:
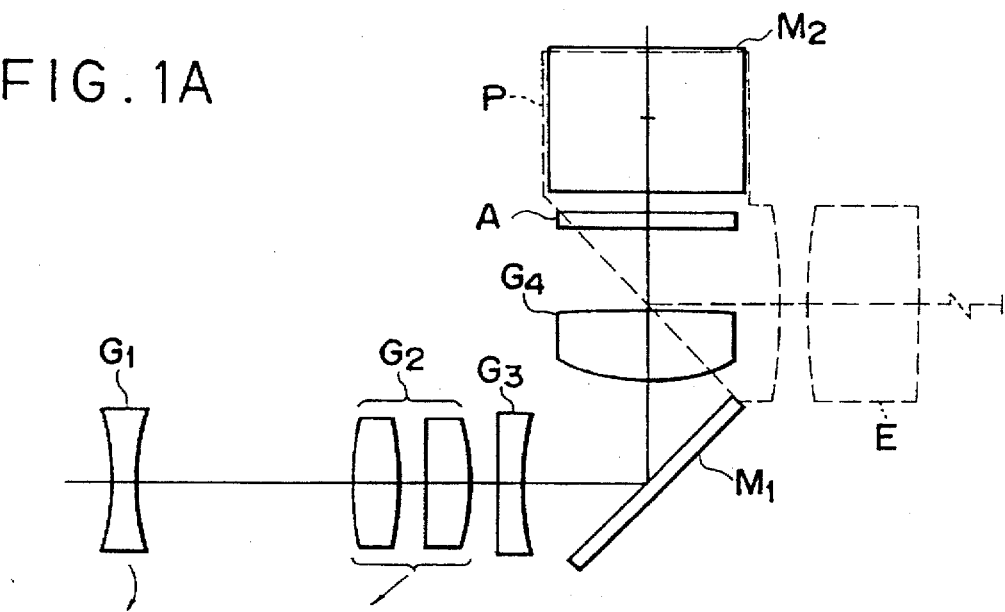
FIG. 1A is a view of a finder of this invention as viewed from above.
Figure 1B:
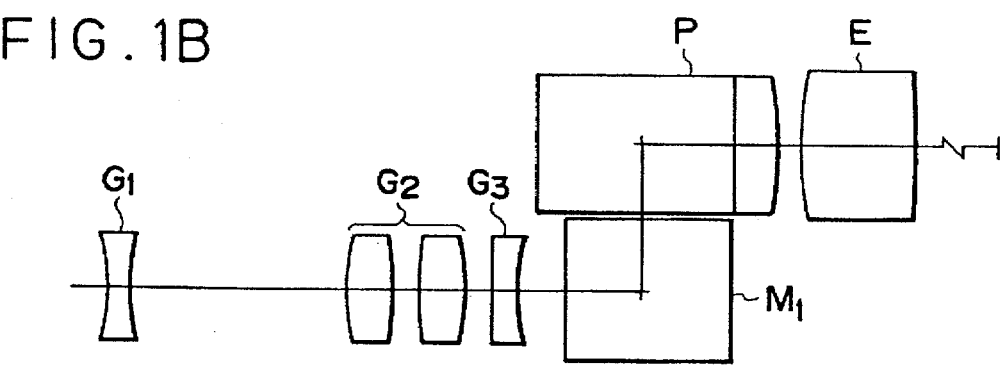
FIG. 1B is a view of the finder of this invention as viewed from a side.
Figure 1C:
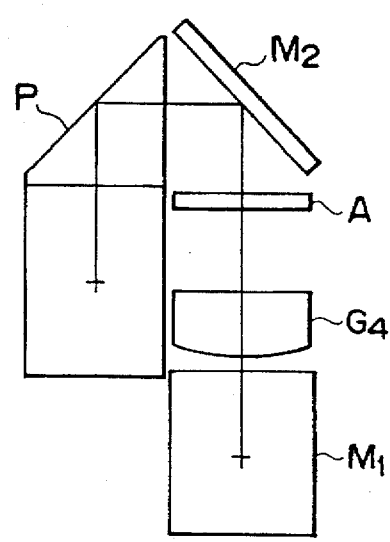
FIG. 1C is a view of an erecting optical system of this invention as viewed from an eye point side.

FIGS. 1A–1C illustrate configurations of finders in accordance with embodiments 1 to 5 of this invention.

FIG. 1A is a view of the finder of this invention as viewed from above. FIG. 1B is a view of the finder of this invention as viewed from a side. FIG. 1C is a view of an erecting system of this invention as viewed from an eye point side.

Referring to FIG. 1A, each of the finders in the embodiments 1 through 5 of the present invention comprises, sequentially from an object side, an objective lens group having a positive refracting power, the objective lens group being constructed of a first lens unit $G_1$ having a negative refracting power, a second lens unit $G_2$ having a positive refracting power, a third lens unit $G_3$ having a negative refracting power, a first reflecting mirror M1 and a fourth lens unit $G_4$ having a positive refracting power on the whole. The finder also comprises a reticle plate A disposed in the vicinity of a focal position of the objective lens group, a second reflecting mirror M2, a prism having two reflecting surfaces and an eyepiece E having a positive refracting power.

The following tables 1, 4, 7, 10, 13, 17, 20 and 23 give values of items according to the present invention.

In the item tables of the embodiments, the reference symbol m designates a magnification, X is an eyesight (diopter), $2\omega$ is a field angle, EP is an eye point, 2H' is a radius of pupil, r is a radius of curvature, d is a surface separation, Abbe is an Abbe number, and n is a refractive index with respect to d-line ($\lambda$=587.6 nm).

Note that an aspherical surface has a surface number marked with * on the right side, while the reticle plate surface has a surface number marked with F on the right side. The aspherical surface is expressed by the above-mentioned formula (a).

[Embodiment 1]

Figure 2:
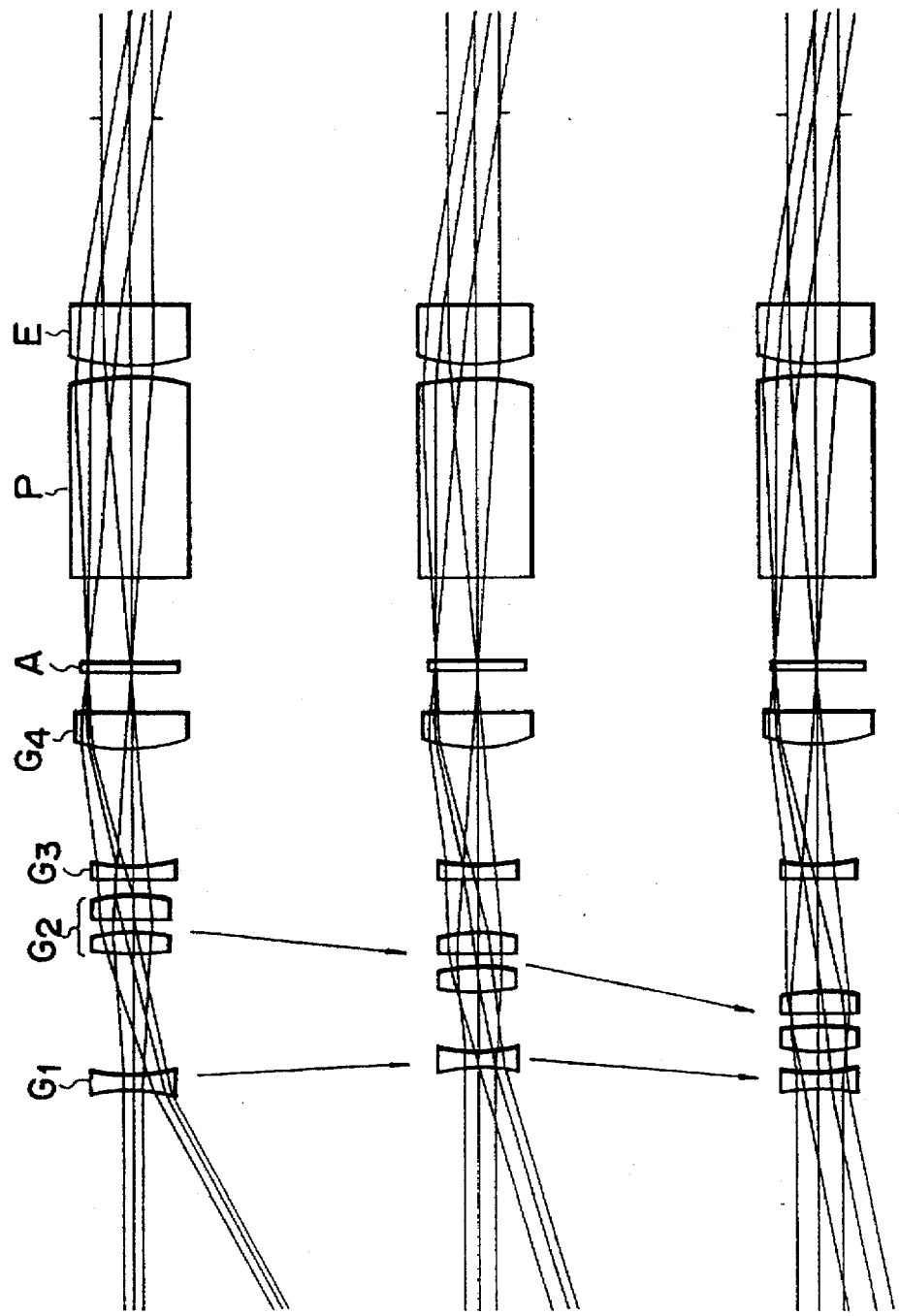
FIG. 2 is a view of a light path, illustrating a construction of an embodiment 1.

FIG. 2 is a view illustrating a light path in an embodiment 1 wherein the configuration shown in FIGS. 1A–1C is developed.

In accordance with the embodiment 1, as illustrated in FIG. 2, a finder comprises, sequentially from an object side, a first lens unit $G_1$ constructed of a biconcave single lens having an aspherical surface on the eye point side, a second lens unit $G_2$ constructed of two lenses, i.e., a biconvex lens having the aspherical surface on the object side and a biconvex spherical lens, a third lens unit $G_3$ constructed of a biconcave single lens, a first reflecting mirror M1, a fourth lens unit $G_4$ constructed of a biconvex single lens having the aspherical surface on the object side, a reticle plate A, a second reflecting mirror M2, a prism P having two reflecting surfaces and an eyepiece E. The reticle plate surface is located on the object side of the reticle plate. An exit plane of the prism P is formed with a convex surface and plays a part of an eyepiece unit.

When varying the magnification from low to high, the second lens unit $G_2$ moves toward the object side from the eye point side. Simultaneously, the first lens unit correspondingly moves toward the object side on a concave trajectory. The variable power is thus attained.

The items in the embodiment 1 are shown in Table 1.

TABLE 1

Items in the Embodiment 1
m = 0.356–0.891   X = –1.00 D
$2\omega$ = 52.9°–19.8°   EP = 15.0   2H' = 4.0

| | r | d | Abbe | n |
|---|---|---|---|---|
| 1) | –12.0580 | 1.1000 | 35.09 | 1.574100 |
| 2)* | 11.5190 | (D1) | | 1.000000 |
| 3)* | 12.5890 | 2.0000 | 57.57 | 1.491080 |
| 4) | –18.4480 | 1.1000 | | 1.000000 |
| 5) | 31.9680 | 2.0000 | 57.57 | 1.491080 |
| 6) | –10.4126 | (D2) | | 1.000000 |
| 7) | –242.5710 | 1.1000 | 35.09 | 1.574100 |
| 8) | 15.0998 | 10.0000 | | 1.000000 |
| 9)* | 8.9830 | 3.0000 | 57.57 | 1.491080 |
| 10) | –48.4330 | 3.4600 | | 1.000000 |
| 11)F | ∞ | 0.7000 | 58.80 | 1.522160 |
| 12) | ∞ | 7.2000 | | 1.000000 |
| 13) | ∞ | 16.9000 | 57.57 | 1.491080 |
| 14) | –24.6380 | 1.2000 | | 1.000000 |
| 15)* | 24.0300 | 5.0000 | 57.57 | 1.491080 |
| 16) | –50.9900 | 15.0000 | | 1.000000 |
| 17> | (eye point) | | | 1.000000 |

An aspherical surface coefficient and a conical coefficient of each surface are shown as follows:

TABLE 2

| Surface No. | K | C2 | C4 | C6 | C8 | C10 |
|---|---|---|---|---|---|---|
| 2 | –4.6500 | 0.0000 | 0.0000 | 0.0000 | $1.2000 \times 10^{-7}$ | 0.0000 |
| 3 | –10.0900 | 0.0000 | 0.0000 | 0.0000 | $-1.1300 \times 10^{-6}$ | 0.0000 |
| 9 | –1.2000 | 0.0000 | 0.0000 | 0.0000 | 0.0000 | 0.0000 |
| 15 | 0.2400 | 0.0000 | 0.0000 | 0.0000 | 0.0000 | 0.0000 |

Variable intervals in the variable power are shown as below:

TABLE 3

| Magnification | 0.35596 | 0.56320 | 0.89108 |
|---|---|---|---|
| D1 | 10.05222 | 4.95223 | 1.72886 |
| D2 | 1.19782 | 4.42122 | 9.52122 |

[Embodiment 2]

Figure 4:
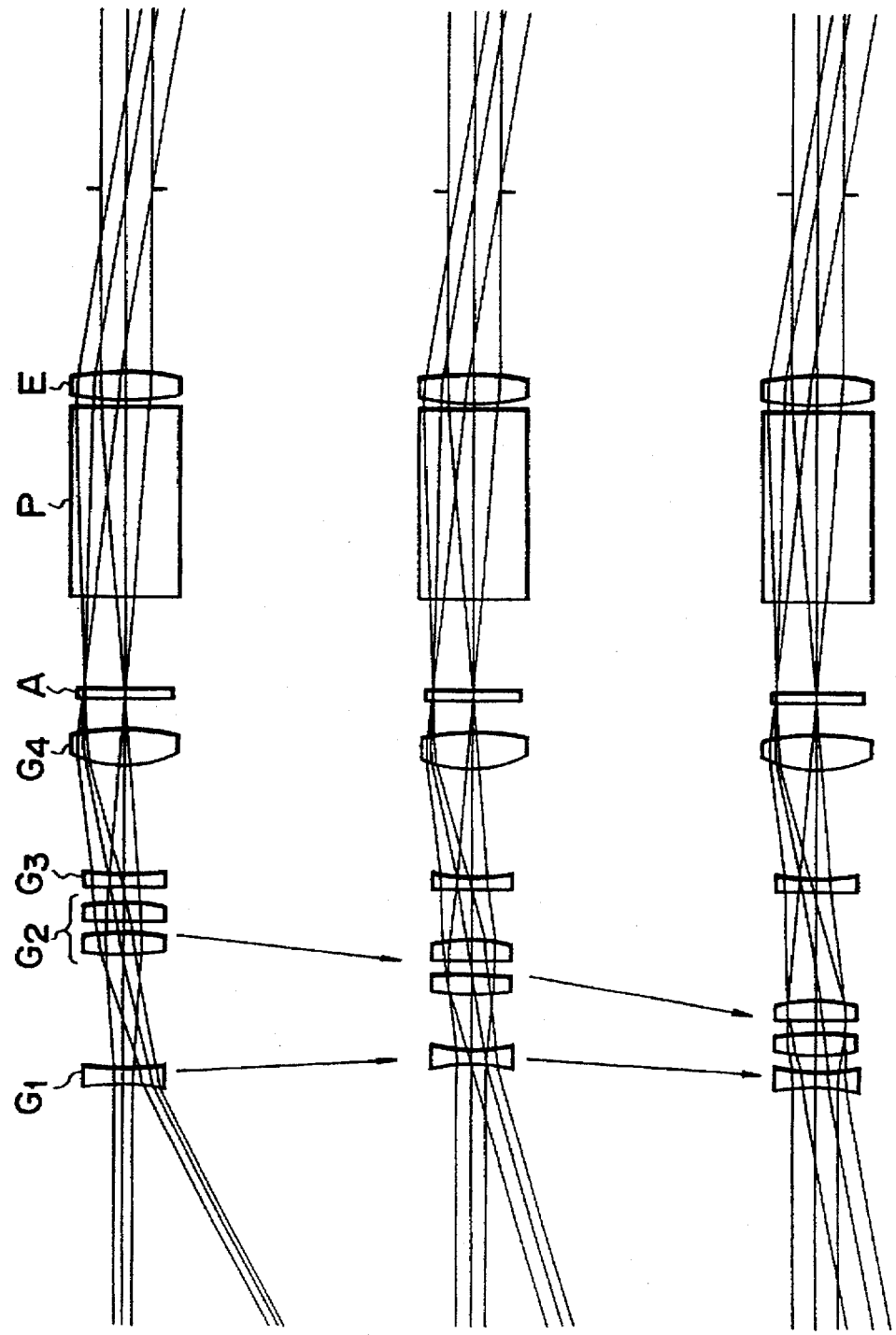
FIG. 4 is a view of the light path, illustrating a construction of an embodiment 2.

FIG. 4 is a view illustrating a light path in an embodiment 2 wherein the configuration shown in FIGS. 1A–1C is developed.

In accordance with the embodiment 2, as illustrated in FIG. 4, the finder comprises, sequentially from an object side, the first lens unit $G_1$ constructed of a biconcave single lens having the aspherical surface on the eye point side, the second lens unit $G_2$ constructed of two lenses, i.e., the biconvex lens having the aspherical surface on the object side and the biconvex spherical lens, the third lens unit $G_3$ constructed of the biconcave single lens, the first reflecting mirror M1, the fourth lens unit $G_4$ constructed of the biconvex single lens having the aspherical surface on the object side, the reticle plate A, the second reflecting mirror M2, the prism P having the two reflecting surfaces and the eyepiece E. The reticle plate surface is located on the eye point side of the reticle plate. The exit plane of the prism P is formed with, unlike the embodiment 1, a flat surface.

When varying the magnification from low to high, the second lens unit $G_2$ moves toward the object side from the eye point side. Simultaneously, the first lens unit correspondingly moves toward the object side on the concave trajectory. The variable power is thus attained.

The items in the embodiment 2 are shown in Table 4.

TABLE 4

Items in the Embodiment 1
m = 0.356–0.891   X = –0.80 D
$2\omega$ = 53.1°–19.9°,   EP = 15.0   2H' = 4.0

| | r | d | Abbe | n |
|---|---|---|---|---|
| 1) | –11.6730 | 1.0000 | 35.09 | 1.574100 |
| 2)* | 11.3335 | (D1) | | 1.000000 |
| 3)* | 11.9921 | 1.8000 | 57.57 | 1.491080 |
| 4) | –21.0232 | 1.0000 | | 1.000000 |
| 5) | 31.9696 | 1.8000 | 57.57 | 1.491080 |
| 6) | –9.2346 | (D2) | | 1.000000 |
| 7) | –72.0388 | 1.0000 | 35.09 | 1.574100 |
| 8) | 17.1188 | 9.6000 | | 1.000000 |
| 9)* | 8.4153 | 2.8000 | 57.57 | 1.491080 |
| 10) | –31.0491 | 2.9000 | | 1.000000 |
| 11) | ∞ | 0.7000 | 58.80 | 1.522160 |
| 12)F | ∞ | 7.8000 | | 1.000000 |

TABLE 4-continued

Items in the Embodiment 1
m = 0.356–0.891   X = –0.80 D
2ω = 53.1°–19.9°,   EP = 15.0   2H' = 4.0

|    | r          | d       | Abbe  | n        |
|----|------------|---------|-------|----------|
| 13) | ∞         | 15.8000 | 57.57 | 1.491080 |
| 14) | ∞         | 0.6000  |       | 1.000000 |
| 15)* | 18.2620  | 2.3000  | 57.57 | 1.491080 |
| 16) | –20.5000  | 15.0000 |       | 1.000000 |
| 17> | (eye point) |       |       | 1.000000 |

The aspherical surface coefficient and the conical coefficient of each surface are shown as follows:

TABLE 5

| Surface No. | K | C2 | C4 | C6 | C8 | C10 |
|---|---|---|---|---|---|---|
| 2 | –4.6337 | 0.0000 | 0.0000 | 0.0000 | $7.2093 \times 10^{-9}$ | 0.0000 |
| 3 | –10.6427 | 0.0000 | 0.0000 | 0.0000 | $-1.9093 \times 10^{-6}$ | 0.0000 |
| 9 | –1.2000 | 0.0000 | 0.0000 | 0.0000 | 0.0000 | 0.0000 |
| 15 | –2.3000 | 0.0000 | 0.0000 | 0.0000 | $-2.0000 \times 10^{-9}$ | 0.0000 |

The variable intervals in the variable power are shown as below:

TABLE 6

| Magnification | 0.35015 | 0.55374 | 0.87538 |
|---|---|---|---|
| D1 | 9.52524 | 4.63879 | 1.55084 |
| D2 | 1.29955 | 4.38635 | 9.26303 |

[Embodiment 3]

Figure 5:
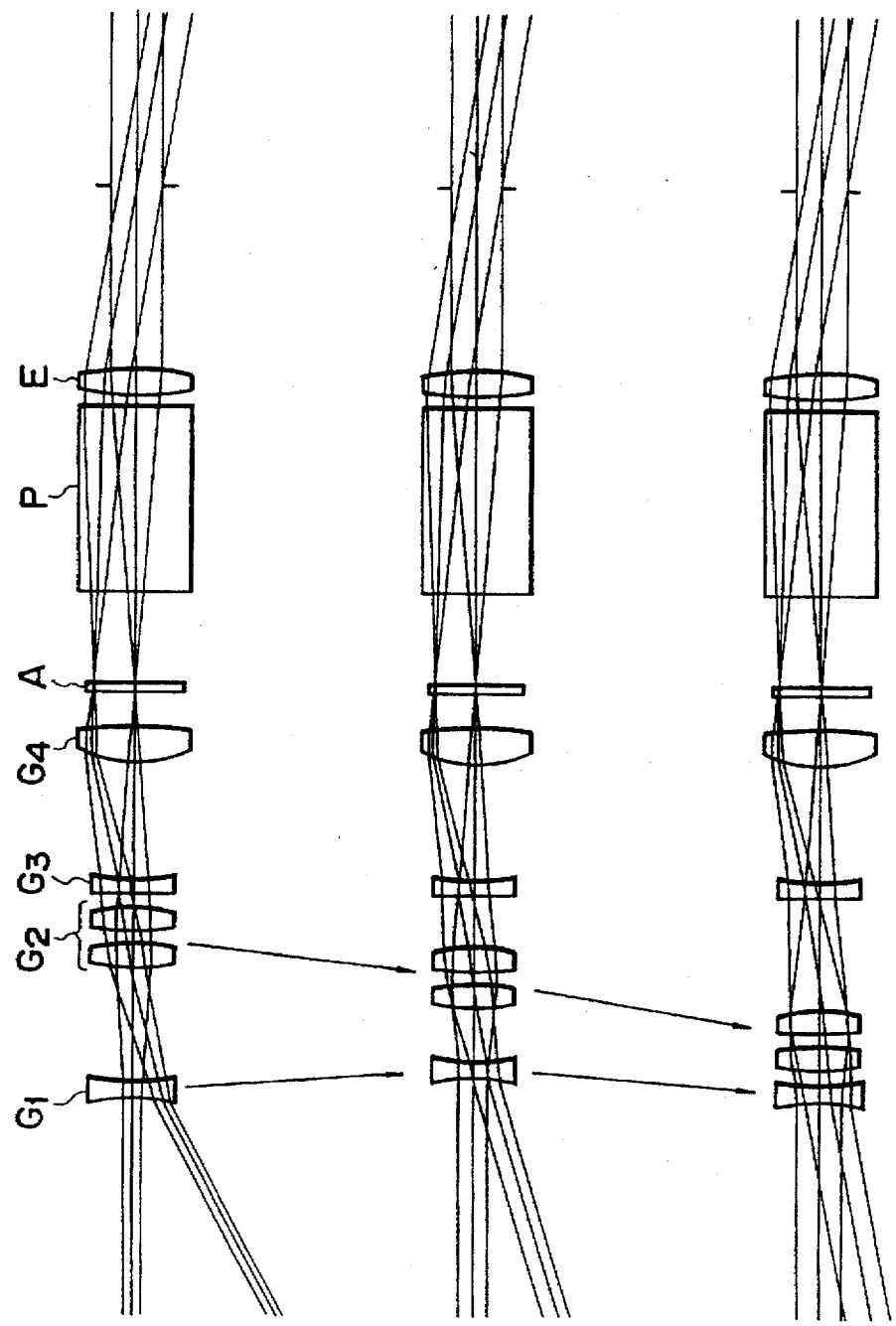
FIG. 5 is a view of the light path, illustrating a construction of an embodiment 3.

FIG. 5 is a view illustrating a light path in an embodiment 3 wherein the configuration shown in FIGS. 1A–1C is developed.

In accordance with the embodiment 3, as illustrated in FIG. 5, the finder comprises, sequentially from an object side, the first lens unit $G_1$ constructed of a biconcave single lens having the aspherical surface on the eye point side, the second lens unit $G_2$ constructed of two lenses, i.e., the biconvex lens having the aspherical surface on the object side and the biconvex spherical lens, the third lens unit $G_3$ constructed of the biconcave single lens, the first reflecting mirror M1, the fourth lens unit $G_4$ constructed of the biconvex single lens having the aspherical surface on the object side, the reticle plate A, the second reflecting mirror M2, the prism P having the two reflecting surfaces and the eyepiece E. The reticle plate surface is located on the eye point side of the reticle plate. The exit plane of the prism P is formed with the flat surface as in the embodiment 2.

When varying the magnification from low to high, the second lens unit $G_2$ moves toward the object side from the eye point side. Simultaneously, the first lens unit correspondingly moves toward the object side on the concave trajectory. The variable power is thus attained.

The items in the embodiment 3 are shown in Table 7.

TABLE 7 m = 0.352–0.881,   X = –0.80 D,
2ω = 53.1°–19.9°,   EP = 15.0   2H' = 4.0

|    | r          | d       | Abbe  | n        |
|----|------------|---------|-------|----------|
| 1) | –12.0197  | 1.2000  | 35.09 | 1.574100 |
| 2)* | 11.6106  | (D1)    |       | 1.000000 |
| 3)* | 12.0565  | 2.0000  | 57.57 | 1.491080 |
| 4) | –17.2234  | 1.0000  |       | 1.000000 |
| 5) | 29.6358   | 2.0000  | 57.57 | 1.491080 |
| 6) | –10.6402  | (D2)    |       | 1.000000 |
| 7) | –71.5287  | 1.2000  | 35.09 | 1.574100 |
| 8) | 17.2712   | 9.6000  |       | 1.000000 |
| 9)* | 8.5564   | 3.0000  | 57.57 | 1.491080 |
| 10) | –31.3594 | 2.9000  |       | 1.000000 |
| 11) | ∞        | 0.7000  | 58.80 | 1.522160 |
| 12)F | ∞       | 7.8000  |       | 1.000000 |
| 13) | ∞        | 15.8000 | 57.57 | 1.491080 |
| 14) | ∞        | 1.0000  |       | 1.000000 |
| 15)* | 18.6200 | 2.4000  | 57.57 | 1.491080 |
| 16) | –21.0000 | 15.0000 |       | 1.000000 |
| 17> | (eye point) |      |       | 1.000000 |

The aspherical surface coefficient and the conical coefficient of each surface are shown as follows:

TABLE 8

| Surface No. | K | C2 | C4 | C6 | C8 | C10 |
|---|---|---|---|---|---|---|
| 2 | –4.5101 | 0.0000 | 0.0000 | 0.0000 | $-7.9849 \times 10^{-8}$ | 0.0000 |
| 3 | –8.8231 | 0.0000 | 0.0000 | 0.0000 | $-1.1943 \times 10^{-6}$ | 0.0000 |
| 9 | –1.2000 | 0.0000 | 0.0000 | 0.0000 | 0.0000 | 0.0000 |
| 15 | –2.2500 | 0.0000 | 0.0000 | 0.0000 | $-1.8000 \times 10^{-9}$ | 0.0000 |

The variable intervals in the variable power are shown as below:

TABLE 9

| Magnification | 0.35242 | 0.55800 | 0.88105 |
|---|---|---|---|
| D1 | 9.40066 | 4.46110 | 1.35624 |
| D2 | 1.02507 | 4.16856 | 9.10831 |

[Embodiment 4]

Figure 6:
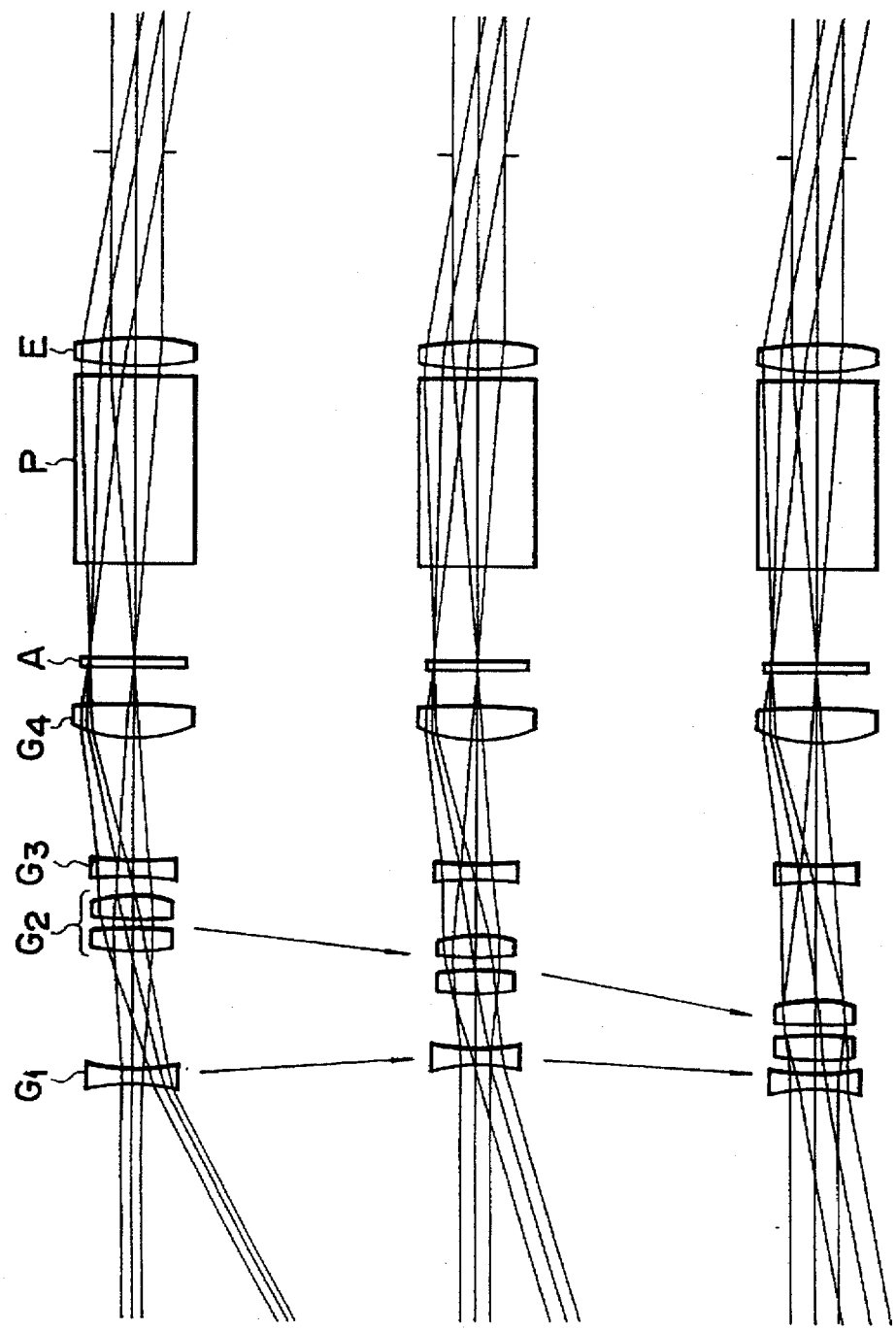
FIG. 6 is a view of the light path, illustrating a construction of an embodiment 4.

FIG. 6 is a view illustrating a light path in an embodiment 4 wherein the configuration shown in FIGS. 1A–1C is developed.

In accordance with the embodiment 4, as illustrated in FIG. 6, the finder comprises, sequentially from an object side, the first lens unit $G_1$ constructed of a biconcave single lens having the aspherical surface on the eye point side, the second lens unit $G_2$ constructed of two lenses, i.e., the biconvex lens having the aspherical surface on the object side and the biconvex spherical lens, the third lens unit $G_3$ constructed of the biconcave single lens, the first reflecting mirror M1, the fourth lens unit $G_1$ constructed of the biconvex single lens having the aspherical surface on the object side, the reticle plate A, the second reflecting mirror M2, the prism P having the two reflecting surfaces and the eyepiece E. The reticle plate surface is located on the eye point side of the reticle plate. The exit plane of the prism P is formed with the flat surface as in the embodiment 2.

When varying the magnification from low to high, the second lens unit $G_2$ moves toward the object side from the eye point side. Simultaneously, the first lens unit correspondingly moves toward the object side on the concave trajectory. The variable power is thus attained.

The items in the embodiment 4 are shown in Table 10.

TABLE 10

Items in the Embodiment 4
$m = 0.379–0.949$, $X = -0.80$ D,
$2\omega = 53.0°–19.8°$, $EP = 15.0$ $2H' = 4.0$

| | r | d | Abbe | n |
|---|---|---|---|---|
| 1) | -12.7906 | 1.2000 | 35.09 | 1.574100 |
| 2)* | 12.6709 | (D1) | | 1.000000 |
| 3)* | 14.3308 | 2.0000 | 57.57 | 1.491080 |
| 4) | -25.1072 | 1.0000 | | 1.000000 |
| 5) | 26.2878 | 2.0000 | 57.57 | 1.491080 |
| 6) | -9.8823 | (D2) | | 1.000000 |
| 7) | -25.1550 | 1.2000 | 35.09 | 1.574100 |
| 8) | 39.2470 | 10.4000 | | 1.000000 |
| 9)* | 8.9977 | 3.0000 | 57.57 | 1.491080 |
| 10) | -40.0139 | 3.1000 | | 1.000000 |
| 11) | ∞ | 0.7000 | 58.80 | 1.522160 |
| 12)F | ∞ | 8.0000 | | 1.000000 |
| 13) | ∞ | 16.0000 | 57.57 | 1.491080 |
| 14) | ∞ | 0.8000 | | 1.000000 |
| 15)* | 18.6140 | 2.4000 | 57.57 | 1.491080 |
| 16) | -21.3000 | 15.0000 | | 1.000000 |
| 17> | (eye point) | | | 1.000000 |

The aspherical surface coefficient and the conical coefficient of each surface are shown as follows:

TABLE 11

| Surface No. | K | C2 | C4 | C6 | C8 | C10 |
|---|---|---|---|---|---|---|
| 2 | -3.7994 | 0.0000 | 0.0000 | 0.0000 | $-9.8755 \times 10^{-8}$ | 0.0000 |
| 3 | -13.2476 | 0.0000 | 0.0000 | 0.0000 | $-1.3052 \times 10^{-6}$ | 0.0000 |
| 9 | -1.2000 | 0.0000 | 0.0000 | 0.0000 | 0.0000 | 0.0000 |
| 15 | -2.1500 | 0.0000 | 0.0000 | 0.0000 | $-1.8000 \times 10^{-9}$ | 0.0000 |

The variable intervals in the variable power are shown as below:

TABLE 12

| Magnification | 0.37942 | 0.59832 | 0.94855 |
|---|---|---|---|
| D1 | 9.98915 | 4.71877 | 1.34573 |
| D2 | 1.66090 | 4.97729 | 10.28352 |

[Embodiment 5]

Figure 7:
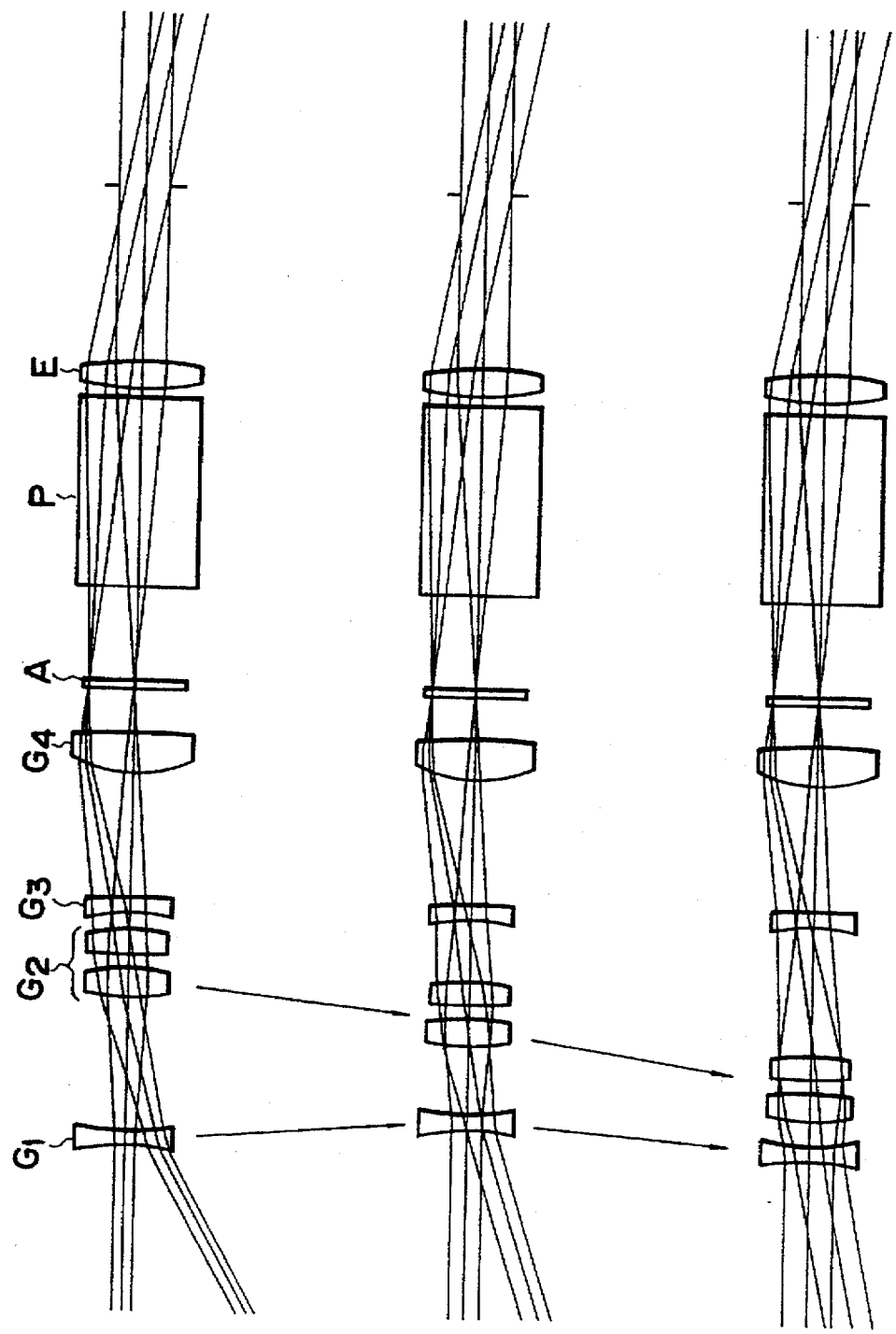
FIG. 7 is a view of the light path, illustrating a construction of an embodiment 5.

FIG. 7 is a view illustrating a light path in an embodiment 5 wherein the configuration shown in FIGS. 1A–1C is developed.

In accordance with the embodiment 5, as illustrated in FIG. 7, the finder comprises, sequentially from an object side, the first lens unit $G_1$ constructed of a biconcave single lens having the aspherical surface on the eye point side, the second lens unit $G_2$ constructed of two lenses, i.e., the biconvex lens having the aspherical surface on the object side and the biconvex spherical lens, the third lens unit $G_3$ constructed of the biconcave single lens, the first reflecting mirror M1, the fourth lens unit $G_4$ constructed of the biconvex single lens having the aspherical surface on the object side, the reticle plate A, the second reflecting mirror M2, the prism P having the two reflecting surfaces and the eyepiece E. The reticle plate surface is located on the eye point side of the reticle plate. The exit plane of the prism P is formed with a flat surface as in the case of the embodiment 2.

When varying the magnification from low to high, the second lens unit $G_2$ moves toward the object side from the eye point side. Simultaneously, the first lens unit correspondingly moves toward the object side on the concave trajectory. The variable power is thus attained.

The items in the embodiment 5 are shown in Table 13.

TABLE 13

Items in the Embodiment 5

$m = 0.379 – 0.949$, $X = -0.80$ D,
$2\omega = 53.0° – 19.8°$, $EP = 15.0$ $2H' = 4.0$

| | r | d | Abbe | n |
|---|---|---|---|---|
| 1) | -15.2727 | 1.2000 | 35.09 | 1.574100 |
| 2)* | 12.0545 | (D1) | | 1.000000 |
| 3)* | 12.1136 | 2.4000 | 57.57 | 1.491080 |
| 4) | -18.0640 | 1.2000 | | 1.000000 |
| 5) | 33.9537 | 2.0000 | 57.57 | 1.491080 |
| 6) | -15.9601 | (D2) | | 1.000000 |
| 7) | -13.9359 | 1.2000 | 35.09 | 1.574100 |
| 8) | -77.5752 | 10.4000 | | 1.000000 |
| 9)* | 9.1718 | 3.4000 | 57.57 | 1.491080 |
| 10) | -42.0379 | 3.5000 | | 1.000000 |
| 11) | ∞ | 0.7000 | 58.80 | 1.522160 |
| 12)F | ∞ | 8.0000 | | 1.000000 |
| 13) | ∞ | 16.0000 | 57.57 | 1.491080 |
| 14) | ∞ | 0.8000 | | 1.000000 |
| 15)* | 18.1640 | 2.4000 | 57.57 | 1.491080 |
| 16) | -21.3000 | 15.0000 | | 1.000000 |
| 17> | (eye point) | | | 1.000000 |

The aspherical surface coefficient and the conical coefficient of each surface are shown as follows:

TABLE 14

| Surface No. | K | C2 | C4 | C6 | C8 | C10 |
|---|---|---|---|---|---|---|
| 2 | -1.5174 | 0.0000 | 0.0000 | 0.0000 | $4.5228 \times 10^{-8}$ | 0.0000 |
| 3 | -3.0040 | 0.0000 | 0.0000 | 0.0000 | $-2.4517 \times 10^{-7}$ | 0.0000 |
| 9 | -1.2000 | 0.0000 | 0.0000 | 0.0000 | 0.0000 | 0.0000 |
| 15 | -2.1500 | 0.0000 | 0.0000 | 0.0000 | $-1.8000 \times 10^{-9}$ | 0.0000 |

The variable intervals in the variable power are shown as below:

TABLE 15

| Magnification | 0.37942 | 0.59832' | 0.94855 |
|---|---|---|---|
| D1 | 11.55357 | 5.84313 | 2.18845 |
| D2 | 1.42848 | 5.02191 | 10.77141 |

Note that condition corresponding numeric values in conditional expressions (1)–(15) in the respective embodiments are as shown in the following Table 16. In the conditional expressions (13), (14) and (15), however, the values are small. The numeric values are therefore shown as 100-fold values. In the conditional expressions (1), (3)–(5) and (8)–(10), however, the absolute values are shown.

The condition corresponding numeric values with respect to each conditional expression in each of the embodiments are given as follows:

TABLE 16

Table of Condition Corresponding Numeric Values in Each Embodiment

| Conditional Expressions | Embodiment 1 | Embodiment 2 | Embodiment 3 | Embodiment 4 | Embodiment 5 |
|---|---|---|---|---|---|
| (1) | 3.877 | 3.850 | 3.766 | 3.852 | 4.084 |
| (2) | 0.166 | 0.145 | 0.141 | 0.150 | 0.170 |
| (3) | 1.582 | 1.582 | 1.577 | 1.583 | 1.583 |
| (4) | 0.868 | 0.852 | 0.842 | 0.853 | 0.854 |
| (5) | 0.635 | 0.575 | 0.582 | 0.576 | 0.526 |
| (6) | 1.568 | 1.541 | 1.499 | 1.510 | 1.425 |
| (7) | 0.346 | 0.389 | 0.380 | 0.388 | 0.388 |
| (8) | 0.955 | 0.971 | 0.966 | 0.991 | 0.789 |
| (9) | 0.682 | 0.570 | 0.700 | 0.571 | 0.671 |
| (10) | 0.185 | 0.271 | 0.273 | 0.225 | 0.218 |
| (11) | 22.5 | 22.5 | 22.5 | 22.5 | 22.5 |
| (12) | 22.5 | 22.5 | 22.5 | 22.5 | 22.5 |
| (13) | 2.931 | 2.928 | 2.928 | 2.951 | 3.057 |
| (14) | 2.658 | 2.625 | 2.716 | 2.410 | 2.976 |
| (15) | 3.069 | 3.069 | 3.069 | 3.069 | 3.069 |

As shown in each aberration chart, it can be understood that various aberrations are well corrected irrespective of down-sizing in configuration with a small moving quantity of the lens in every embodiment.

As discussed above, in accordance with the first through fifth embodiments of this invention, it is possible to obtain the small-sized finder exhibiting a variable power ratio of 2.5 or larger, wherein internal foreign matters do not become conspicuous when viewing through the finder. The finder is capable of reducing a cubage of the prism and, hence, comparatively small in terms of costs.

[Embodiment 6]

Figure 3:
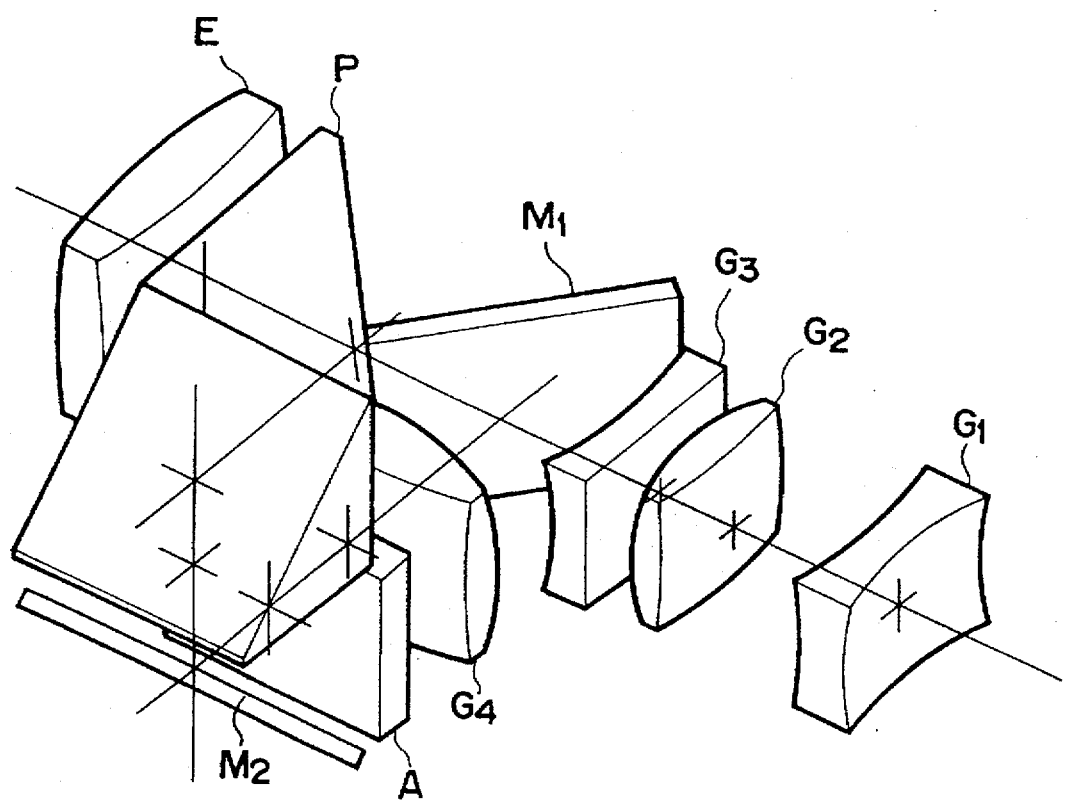
FIG. 3 is a perspective view showing a construction of the finder of the present invention.

In accordance with an embodiment 6, as illustrated in FIG. 3, the finder comprises, sequentially from an object side, the first lens unit $G_1$ constructed of a biconcave single lens having the aspherical surface on the object side, the second lens unit $G_2$ constructed of a biconvex lens having the aspherical surface on the object side, the third lens unit $G_3$ constructed of a negative single lens, the first reflecting mirror M1, the fourth lens unit $G_4$ constructed of a biconvex single lens having the aspherical surface on the object side, the reticle plate A, the second reflecting mirror M2, the prism P having the two reflecting surfaces and an eyepiece E having the aspherical surface on the object side.

Then, when varying the magnification from low to high, the second lens unit $G_2$ moves toward the object side from the eye point side. Simultaneously, the first lens unit $G_1$ correspondingly moves toward the object side on the concave trajectory. The variable power is thus attained.

Figure 8:
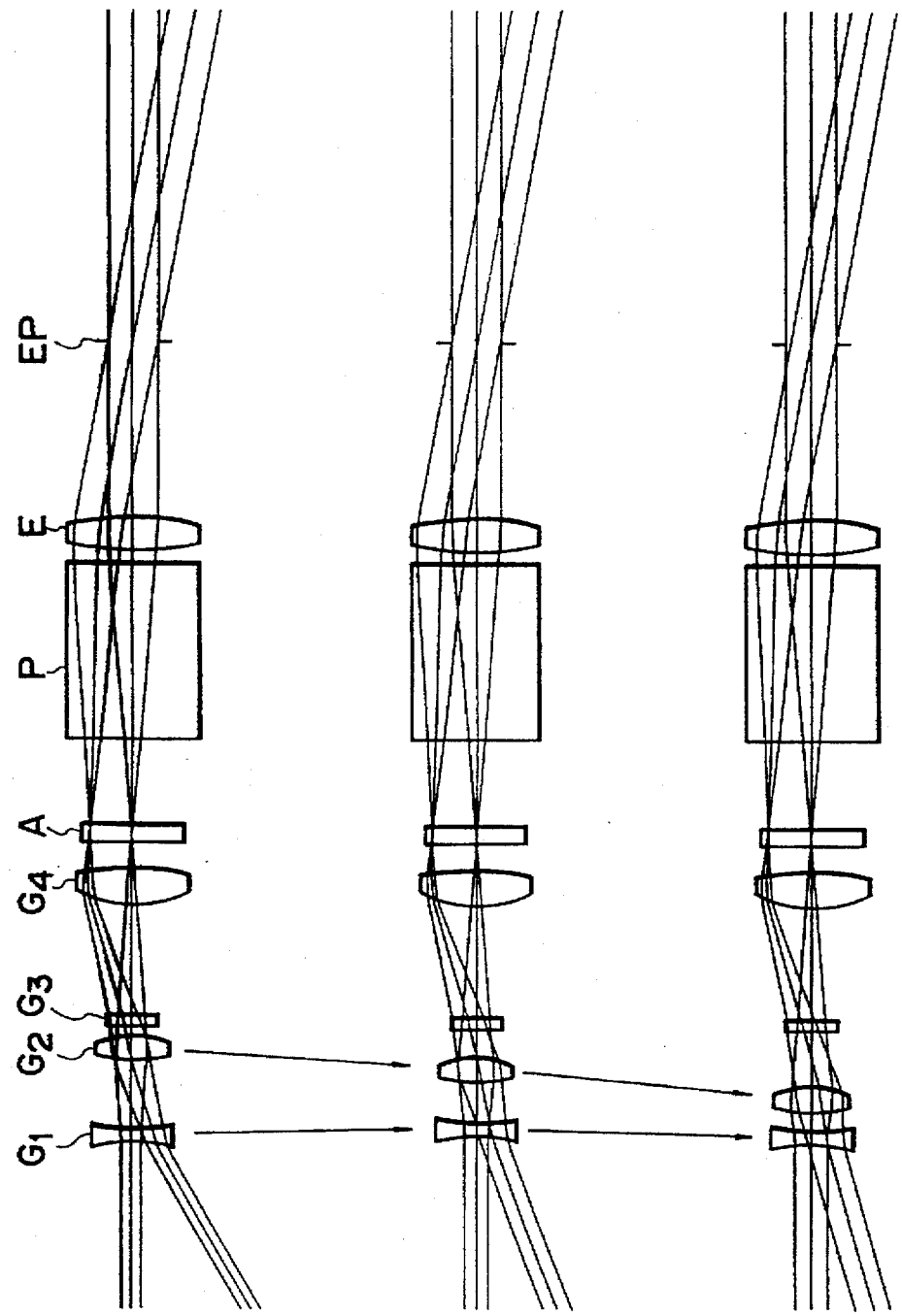
FIG. 8 is a view of the light path, illustrating a construction of an embodiment 6.

The items in the embodiment 6 are shown in Table 17. FIG. 8 is a view illustrating a development light path of an optical system.

TABLE 17

Items in the Embodiment 6 m = 0.367 – 0.652  X = –1.00 D
2ω = 55.4° – 29.1°  EP = 15.0  2H' = 4.0

| | r | d | Abbe | n |
|---|---|---|---|---|
| 1)* | –8.9326 | 1.0000 | 35.09 | 1.574100 |
| 2) | 14.9774 | (D1) | | 1.000000 |
| 3)* | 6.7261 | 2.2000 | 57.57 | 1.491080 |

TABLE 17-continued

Items in the Embodiment 6

| | | | | |
|---|---|---|---|---|
| 4) | –6.2735 | (D2) | | 1.000000 |
| 5) | 46.3345 | 1.0000 | 35.09 | 1.574100 |
| 6) | 10.9134 | 9.4000 | | 1.000000 |
| 7)* | 7.8667 | 3.0000 | 57.57 | 1.491080 |
| 8) | –19.1804 | 2.2000 | | 1.000000 |
| 9)F | ∞ | 1.4000 | 58.80 | 1.522160 |
| 10) | ∞ | 7.4000 | | 1.000000 |
| 11) | ∞ | 15.4000 | 57.57 | 1.491080 |
| 12) | ∞ | 1.0000 | | 1.000000 |
| 13)* | 18.8600 | 2.8000 | 57.57 | 1.491080 |
| 14) | –20.6000 | 15.0000 | | 1.000000 |
| 15) | (eye point) | | | 1.000000 |

The aspherical surface coefficient and the conical coefficient of each surface are shown as follows:

TABLE 18

| Surface No. | K | C2 | C4 | C6 | C8 | C10 |
|---|---|---|---|---|---|---|
| 1 | –1.9167 | 0.0000 | 0.0000 | 0.0000 | $-1.7102 \times 10^{-6}$ | 0.0000 |
| 3 | –4.2098 | 0.0000 | 0.0000 | 0.0000 | $7.5185 \times 10^{-6}$ | 0.0000 |
| 7 | –1.2000 | 0.0000 | 0.0000 | 0.0000 | 0.0000 | 0.0000 |
| 13 | –2.5000 | 0.0000 | 0.0000 | 0.0000 | $-1.3000 \times 10^{-9}$ | 0.0000 |

The variable intervals in the variable power are shown as below:

TABLE 19

| Magnification | 0.36700 | 0.48933 | 0.65244 |
|---|---|---|---|
| D1 | 5.75925 | 3.36932 | 1.57688 |
| D2 | 0.68562 | 2.39419 | 4.67227 |

[Embodiment 7]

Figure 9:
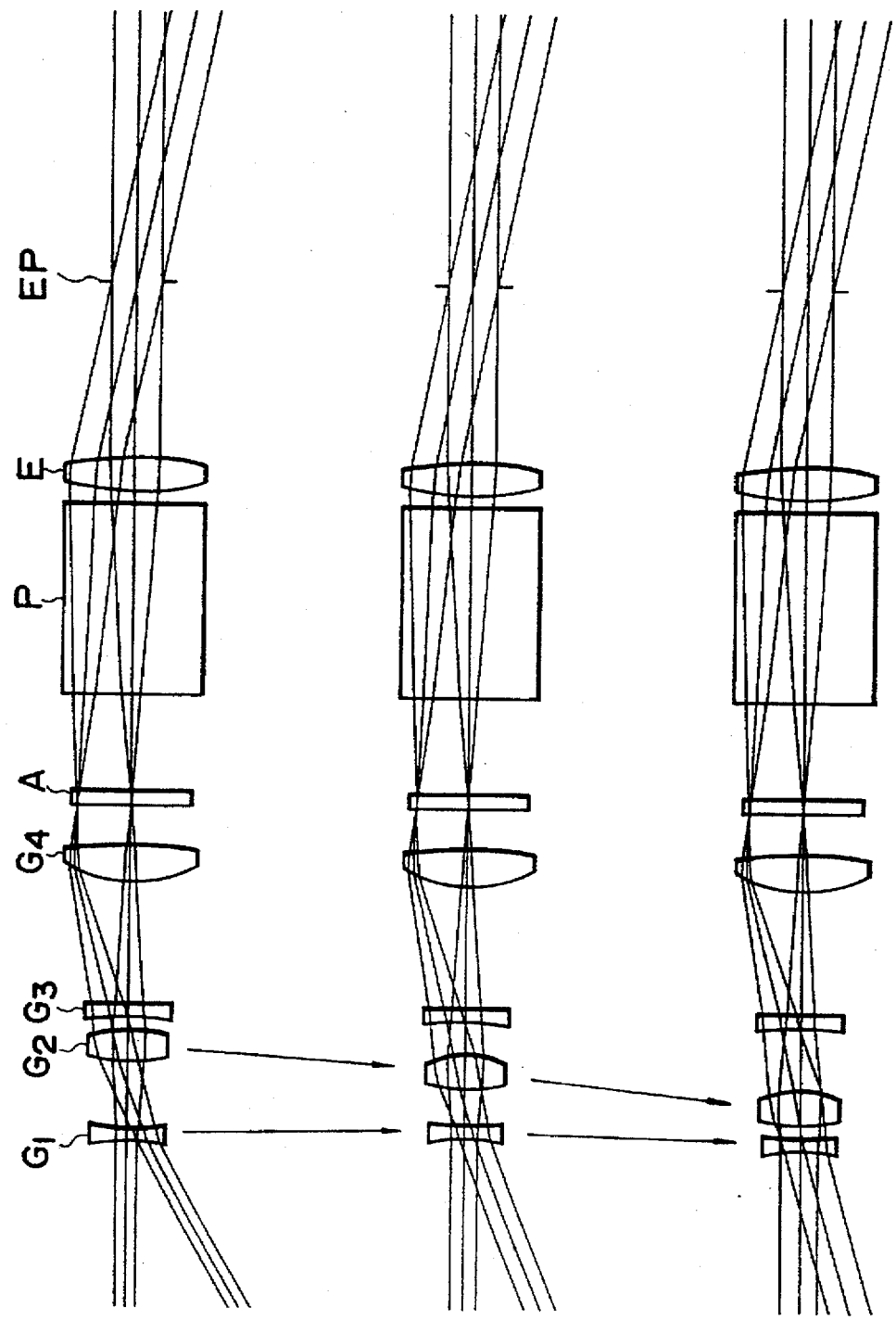
FIG. 9 is a view of the light path, illustrating a construction of an embodiment 7.

An embodiment 7 has much the same configuration as the embodiment 6. The mirrors, the prism, etc. are arranged in the same way with FIG. 3. FIG. 9 is a view illustrating a development light path in the embodiment 7. As illustrated in FIG. 9, when varying the magnification from low to high, the first and second lens units $G_1$, $G_2$ move on the same trajectory as that in the embodiment 6.

Note that the third lens unit $G_3$ constructed of a negative single lens is formed with an aspherical surface on the object side.

The items in the embodiment 7 are shown in Table 20.

TABLE 20

Items in the Embodiment 7 m = 0.404 – 0.719  X = –1.00 D
2ω = 55.3° – 29.0°  EP = 15.0  2H' = 4.0

| | r | d | Abbe | n |
|---|---|---|---|---|
| 1)* | –10.0459 | 1.0000 | 35.09 | 1.574100 |
| 2) | 18.3751 | (D1) | | 1.000000 |
| 3)* | 8.4554 | 3.0000 | 57.57 | 1.491080 |
| 4) | –6.4054 | (D2) | | 1.000000 |
| 5)* | –17.3030 | 1.0000 | 35.09 | 1.574100 |
| 6) | –444.3384 | 10.4000 | | 1.000000 |
| 7)* | 9.2776 | 3.0000 | 57.57 | 1.491080 |
| 8) | –33.9374 | 3.4000 | | 1.000000 |
| 9)F | ∞ | 1.2000 | 58.80 | 1.522160 |
| 10) | ∞ | 8.4000 | | 1.000000 |

TABLE 20-continued

| Items in the Embodiment 7 | | | | |
|---|---|---|---|---|
| 11) | ∞ | 16.2000 | 57.57 | 1.491080 |
| 12) | ∞ | 1.0000 | | 1.000000 |
| 13)* | 19.2050 | 2.8000 | 57.57 | 1.491080 |
| 14) | −24.5000 | 15.0000 | | 1.000000 |
| 15> | (eye point) | | | 1.000000 |

The aspherical surface coefficient and the conical coefficient of each surface are shown as follows:

TABLE 21

| Surface No. | K | C2 | C4 | C6 | C8 | C10 |
|---|---|---|---|---|---|---|
| 1 | −3.6794 | 0.0000 | 0.0000 | 0.0000 | −2.1767 × $10^{-5}$ | −2.7807 × $10^{-6}$ |
| 3 | −7.3313 | 0.0000 | 0.0000 | 0.0000 | −4.1443 × $10^{-5}$ | 2.4172 × $10^{-7}$ |
| 5 | 0.8360 | 0.0000 | 0.0000 | 0.0000 | 8.6673 × $10^{-7}$ | 0.0000 |
| 7 | −1.2000 | 0.0000 | 0.0000 | 0.0000 | 0.0000 | 0.0000 |
| 13 | −1.7000 | 0.0000 | 0.0000 | 0.0000 | −1.0000 × $10^{-9}$ | 0.0000 |

The variable intervals in the variable power are shown as below:

TABLE 22

| Magnification | 0.40441 | 0.53922 | 0.71896 |
|---|---|---|---|
| D1 | 5.75327 | 3.10200 | 1.11355 |
| D2 | 1.17233 | 3.15887 | 5.80761 |

[Embodiment 8]

Figure 10:
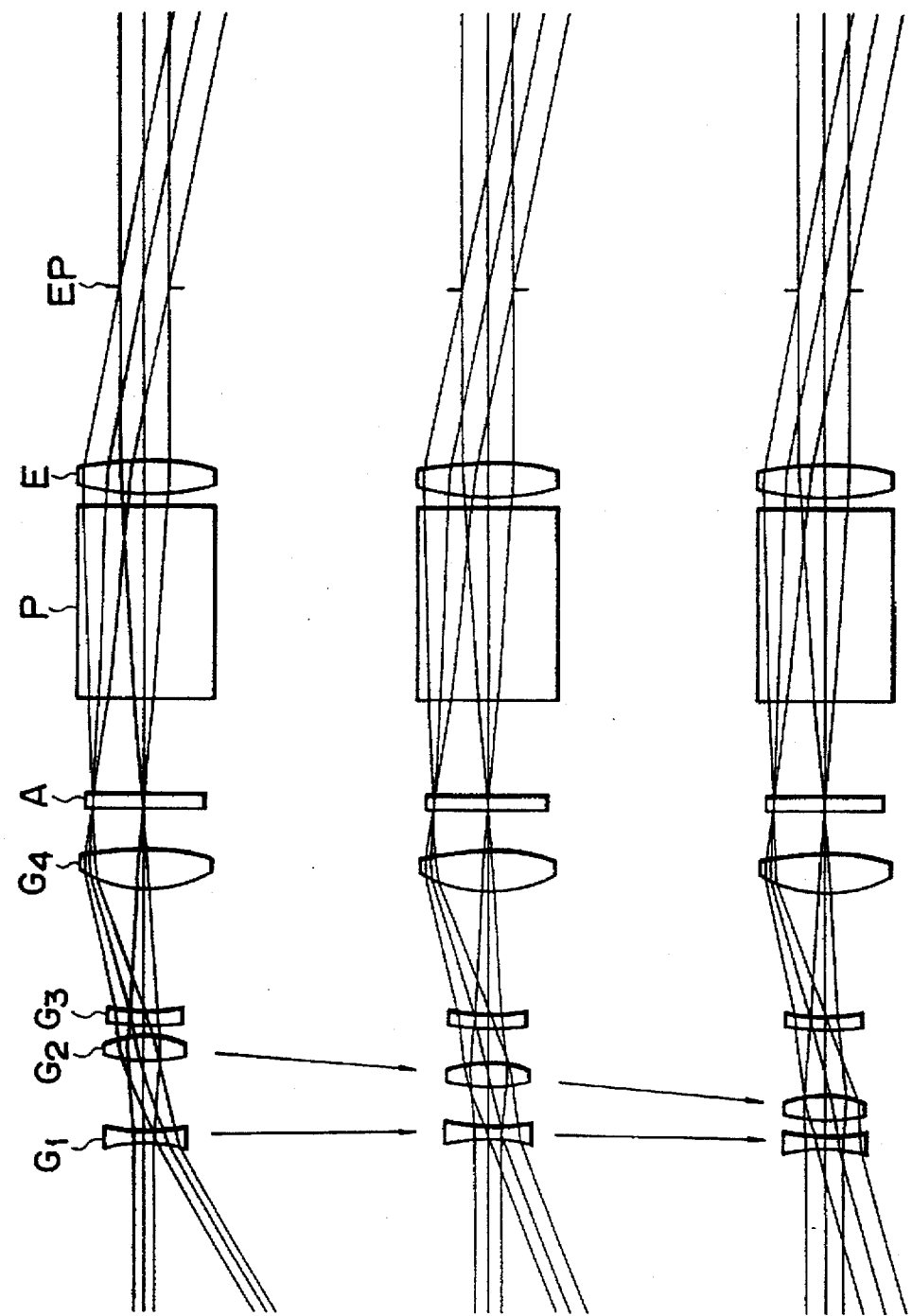
FIG. 10 is a view of the light path, illustrating a construction of an embodiment 8.

An embodiment 8 has much the same configuration as the embodiment 6. The mirrors, the prism, etc. are arranged in the same way with FIG. 3. FIG. 10 is a view illustrating a development light path in the embodiment 8. As illustrated in FIG. 10, when varying the magnification from low to high, the first and second lens units $G_1$, $G_2$ move on the same trajectory as that in the embodiment 6.

The items in the embodiment 8 are shown in Table 23.

TABLE 23

| Items in the Embodiment 8 | | | | |
|---|---|---|---|---|
| m = 0.404 − 0.719 | | X = −1.00 D | | |
| 2ω = 55.5° − 29.0° | | EP = 15.0 | | 2H' = 4.0 |
| | r | d | Abbe | n |
| 1)* | −10.5048 | 1.0000 | 35.09 | 1.574100 |
| 2) | 18.3451 | (D1) | | 1.000000 |
| 3)* | 7.6866 | 2.2000 | 57.57 | 1.491080 |
| 4) | −7.2782 | (D2) | | 1.000000 |
| 5) | 35.6906 | 1.0000 | 35.09 | 1.574100 |
| 6) | 11.1979 | 10.4000 | | 1.000000 |
| 7)* | 9.4002 | 3.2000 | 57.57 | 1.491080 |
| 8) | −20.0180 | 3.4000 | | 1.000000 |
| 9)F | ∞ | 1.2000 | 58.80 | 1.522160 |
| 10) | ∞ | 8.4000 | | 1.000000 |
| 11) | ∞ | 16.2000 | 57.57 | 1.491080 |
| 12) | ∞ | 1.0000 | | 1.000000 |
| 13)* | 19.2050 | 2.8000 | 57.57 | 1.491080 |
| 14) | −24.5000 | 15.0000 | | 1.000000 |
| 15> | (eye point) | | | 1.000000 |

The aspherical surface coefficient and the conical coefficient of each surface are shown as follows:

TABLE 24

| Surface No. | K | C2 | C4 | C6 | C8 | C10 |
|---|---|---|---|---|---|---|
| 1 | −1.8503 | 0.0000 | 0.0000 | 0.000 | −1.2087 × $10^{-6}$ | 0.0000 |
| 3 | −4.1067 | 0.0000 | 0.0000 | 0.0000 | −2.5825 × $10^{-6}$ | 0.0000 |
| 7 | −1.2000 | 0.0000 | 0.0000 | 0.0000 | 0.0000 | 0.0000 |
| 13 | −1.7000 | 0.0000 | 0.0000 | 0.0000 | −1.0000 × $10^{-9}$ | 0.0000 |

The variable intervals in the variable power are shown as below:

TABLE 25

| Magnification | 0.40441 | 0.53922 | 0.71896 |
|---|---|---|---|
| D1 | 5.98810 | 3.31974 | 1.31847 |
| D2 | 1.01480 | 3.01353 | 5.67851 |

Note that condition corresponding numeric values in conditional expressions (21)–(35) in the respective embodiments are as shown in the following Table 26. In the conditional expressions (33), (34) and (35), however, the values are small. The numeric values are therefore shown as 100-fold values. In the conditional expressions (21), (23), (24) and (27)–(30), however, the absolute values are shown.

The condition corresponding numeric values with respect to each conditional expression in each of the embodiments are given as follows:

TABLE 26

| Table of Condition Corresponding Numeric Values in Each Embodiment | | | |
|---|---|---|---|
| Conditional Expressions | Embodiment 6 | Embodiment 7 | Embodiment 8 |
| (21) −$f_3/f_w$ | 3.574 | 3.748 | 3.350 |
| (22) $D_4/f_e$ | 0.107 | 0.152 | 0.152 |
| (23) r12/r11 | 1.677 | 1.829 | 1.746 |
| (24) r13/r14 | 1.072 | 1.320 | 1.056 |
| (25) $D_3/f_w$ | 1.337 | 1.242 | 1.208 |
| (26) $D_4/f_e$ | 0.360 | 0.375 | 0.375 |
| (27) −$f_1/f_w$ | 1.366 | 1.333 | 1.334 |
| (28) −$f_2/f_1$ | 0.729 | 0.711 | 0.696 |
| (29) −$f_4/f_3$ | 0.469 | 0.484 | 0.468 |
| (30) −r1/r18 | 0.410 | 0.273 | 0.470 |
| (31) ν2−ν1 | 22.5 | 22.5 | 22.5 |
| (32) ν2−ν3 | 22.5 | 22.5 | 22.5 |
| (33) S11/r11 | 3.048 | 3.030 | 3.066 |
| (34) S13/r13 | 2.936 | 2.817 | 2.940 |
| (35) S17/r17 | 3.069 | 3.069 | 3.069 |

In the finder of the present invention, it can be understood that the various aberrations are, as shown in the respective charts of aberrations, well corrected in each embodiment irrespective of the construction in which both the size and the moving quantity of the lens are small.

Note that the construction of this invention has comparatively large air spacings in front and in rear of the reticle plate enough to provide an allowance in terms of an unload space. It is feasible to simply switch, e.g., a normal mode and a panorama mode by replacing the field frame. Further, the flat reticle plate is independently incorporated and therefore constructed of a liquid crystal or the like. With this construction, the parallax can be also simply electrically corrected.

According to the sixth through eighth embodiments of the present invention, as discussed above, it is possible to obtain the small-sized finder wherein the internal foreign matters do not become conspicuous when viewing through the finder, the cubage of the prism can be reduced, the costs are therefore relatively low, and the variable power ratio is on the order of 2.

It is apparent that, in this invention, a wide range of different working modes can be formed based on the invention without deviating from the spirit and scope of the invention. This invention is not restricted by its specific working modes except being limited by the appended claims.

What is claimed is:

1. A Keplerian zoom finder optical system comprising:

an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power;

a regulating unit, disposed in the vicinity of a focal position of said objective lens group, which regulates a visual field; and an eyepiece unit having a positive refracting power, wherein said Keplerian zoom finder optical system is a finder for varying a magnification by moving at least said second lens unit along an optical axis and satisfies the following condition:

$$-5 < f_3/f_w < -3$$

where $f_w$: the synthetic focal length of said first and second lens units in a minimum magnification state, and $f_3$: the focal length of said third lens unit, and wherein at least said second lens unit is moved so that when varying the magnification from low to high, said finder reduces a distance between said first lens unit and said second lens unit and increases a distance between said second lens unit and said third lens unit, and wherein said fourth lens unit is fixed in varying the magnification.

2. The Keplerian zoom finder optical system according to claim 1, wherein said regulating unit is a reticle, and said finder satisfies the following condition:

$$0.1 < D_4/f_e < 0.3$$

where $f_e$: the focal length of said eyepiece unit, and $D_4$: the distance on the optical axis from an eye-point-side surface of said fourth lens unit to an object-side surface of said reticle.

3. The Keplerian zoom finder optical system according to claim 1, wherein said regulating unit is a field frame, and said finder satisfies the following condition:

$$0.1 < D_4/f_e < 0.3$$

where $f_e$: the focal length of said eyepiece unit, and $D_4$: the distance on the optical axis from an eye-point-side surface of said fourth lens unit to said field frame.

4. The Keplerian zoom finder optical system according to claim 1, wherein said regulating unit is a reticle constructed of a parallel plane flat plate, and said finder satisfies the following conditions:

$$-1.7 < f_1/f_w < -1.2$$

$$-0.9 < f_2/f_1 < -0.6$$

$$-0.7 < f_4/f_3 < -0.44$$

where $f_1$: the focal length of said first lens unit, $f_2$: the focal length of said second lens unit, and $f_4$: the focal length of said fourth lens unit.

5. A Keplerian zoom finder optical system comprising:

an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power;

a regulating unit, disposed in the vicinity of a focal position of said objective lens group, which regulates a visual field; and an eyepiece unit having a positive refracting power, wherein said Keplerian zoom finder optical system is a finder for varying a magnification by moving at least said second lens unit along an optical axis and satisfies the following conditions:

$$-5 < f_3/f_w < -3$$

$$0.1 < D_4/f_e < 0.3$$

where $f_w$: the synthetic focal length of said first and second lens units in a minimum magnification state, $f_3$: the focal length of said third lens unit, $f_e$: the focal length of said eyepiece unit, and $D_4$: the distance on the optical axis from the eye-point-side surface of said fourth lens unit to said regulating unit.

6. The Keplerian zoom finder optical system according to claim 5, wherein said first and second lens units move on the optical axis when varying a magnification from low to high, and said third and fourth lens units are fixed.

7. The Keplerian zoom finder optical system according to claim 6, wherein said regulating unit is a reticle constructed of a parallel plane flat plate, and said finder satisfies the following conditions:

$$-1.7 < f_1/f_w < -1.3$$

$$-0.9 < f_2/f_1 < -0.8$$

$$-0.7 < f_4/f_3 < -0.5$$

where $f_1$: the focal length of said first lens unit, $f_2$: the focal length of said second lens unit, and $f_4$: the focal length of said fourth lens unit.

8. The Keplerian zoom finder optical system according to claim 6, wherein said regulating is a reticle constructed of a parallel plane flat plate, and said finder satisfies the following conditions:

$$-1.7 < f_1/f_w < -1.2$$

$$-0.9 < f_2/f_1 < -0.6$$

$$-0.7 < f_4/f_3 < -0.44$$

where f₁: the focal length of said first lens unit, f₂: the focal length of said second lens unit, and f₄: the focal length of said fourth lens unit.

9. A Keplerian zoom finder optical system according to claim 5, wherein at least said second lens unit is moved so that when varying the magnification from low to high, said finder reduces a distance between said first lens unit and said second lens unit and increases a distance between said second lens unit and said third lens unit, and wherein said fourth lens unit is fixed in varying the magnification.

10. A Keplerian zoom finder optical system comprising:

an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power;

a reticle plate constructed of a parallel plane flat plate disposed in the vicinity of a focal position of said objective lens group;

an eyepiece unit having a positive refracting power;

a first mirror disposed in an air spacing between said third lens unit and said fourth lens unit;

a prism having two reflecting surfaces and disposed between said reticle plate and said eyepiece unit or disposed in said eyepiece unit; and a second mirror disposed in an air spacing between said prism and said reticle plate, wherein said first mirror, said second mirror, and said two reflecting surfaces of said prism are arranged so that a finder image of said Keplerian zoom finder optical system is erected by said first and second mirrors in combination with the two reflecting surfaces, and said Keplerian zoom finder optical system is constructed to vary a magnification when at least said second lens unit is moved along an optical axis.

11. The Keplerian zoom finder optical system according to claim 10, wherein said finder satisfies the following conditions:

$$1.0 < D_3/f_w < 1.8$$

$$0.1 < D_4/f_e < 0.3$$

$$0.3 < D_e/f_e < 0.5$$

where

D₃: the distance on the optical axis from the eye-point-side surface of said third lens unit to the object-side surface of said fourth lens unit in the minimum magnification state, D₄: the distance on the optical axis from the eye-point-side surface of said fourth lens unit to the object-side surface of said reticle plate, and D_e: the distance on the optical axis from an eye-point-side surface of said reticle plate to a plane of incidence of said prism.

12. A Keplerian zoom finder optical system according to claim 10, wherein at least said second lens unit is moved so that when varying the magnification from low to high, said Keplerian zoom finder optical system reduces a distance between said first lens unit and said second lens unit and increases a distance between said second lens unit and said third lens unit, and wherein said fourth lens unit is fixed in varying the magnification.

13. A Keplerian zoom finder optical system comprising:

an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power;

a regulating unit, disposed in the vicinity of a focal position of said objective lens group, which regulates a visual field; and an eyepiece unit having a positive refracting power, wherein said Keplerian zoom finder optical system is a finder for varying a magnification by moving at least said second lens unit along an optical axis and satisfies the following condition:

$$1.0 < \beta_{34} < 1.3$$

where $\beta_{34}$: the synthetic magnification of said third and fourth lens units, and wherein at least said second lens unit is moved so that when varying the magnification from low to high, said finder reduces a distance between said first lens unit and said second lens unit and increases a distance between said second lens unit and said third lens unit, and wherein said fourth lens unit is fixed in varying the magnification.

14. The Keplerian zoom finder optical system according to claim 13, wherein said finder satisfies the following condition:

$$0.1 < D_4/f_e < 0.3$$

where f_e: the focal length of said eyepiece unit, and

D₄: the distance on the optical axis from the eye-point-side surface of said fourth lens unit to the object-side surface of said reticle.

15. A Keplerian zoom finder optical system comprising:

an objective lens group having a positive refracting power on the whole, said lens group being constructed of, in order from an object side, a first lens unit having a negative refracting power, a second lens unit having a positive refracting power, a third lens unit having a negative refracting power and a fourth lens unit having a positive refracting power;

a regulating unit, disposed in the vicinity of a focal position of said objective lens group, which regulates a visual field; and an eyepiece unit having a positive refracting power, wherein said Keplerian zoom finder optical system is a finder for varying a magnification by moving at least said second lens unit along an optical axis and by varying the distances between said second lens unit and lens units at opposite sides of said second lens unit, and at least a first surface of said second lens unit and a first surface of said fourth lens unit have aspherical surfaces each exhibiting a refracting power which becomes weaker as it approaches the periphery thereof, and wherein at least said second lens unit is moved so that when varying the magnification from low to high, said finder reduces a distance between said first lens unit and said second lens unit and increases a distance between said second lens unit and said third lens unit, and wherein said fourth lens unit is fixed in varying the magnification.

16. The Keplerian zoom finder optical system according to claim 15, wherein said finder satisfies the following conditions:

$$0.02 < S_{13}/r_{13} < 0.03$$

$$0.03 < S_{17}/r_{17} < 0.031$$

an aspherical surface is generally expressed by:

$$S(y)=(y^2/R)/\{1+(1-ky^2/R^2)^{1/2}\}+C_2 xy^2+C_4 xy^4+C_6 xy^6+C_8 xy^8+C_{10} xy^{10}+$$

where y is the height in a direction perpendicular to the optical axis, S(y) is the quantity of shift in the optical-axis direction at the height y, r is the fiducial radius of curvature, k is the conical coefficient, and $C_n$ is the nth-order aspherical surface coefficient, and, when the paraxial curvature radius r of this surface is defined such as:

$$r=1/(2 \times C_2+1/R)$$

the following is given:

$S_{13}$: the quantity of shift of an object-side aspherical surface of said second lens unit in the optical-axis direction when the height $y=0.25 \cdot r_{13}$, $S_{17}$: the quantity of shift of an object-side aspherical surface of said fourth lens unit in the optical-axis direction when the height $y=0.25 \cdot r_{17}$, $r_{17}$: the paraxial curvature radius of an object-side surface of said fourth lens unit, and $r_{13}$: the paraxial curvature radius of an object-side surface of said second lens unit.

17. The Keplerian zoom finder optical system according to claim 15, wherein said second lens unit is constructed of two positive lenses, a closet-to-the-object surface thereof is an aspherical surface, said fourth lens unit is constructed of a biconvex single lens having an aspherical surface on the object side thereof, and said finder satisfies the following conditions:

$$-1.1 < r_2/r_1 < -0.5$$

$$-0.9 < r_3/r_4 < -0.4$$

$$-0.4 < r_9/r_{10} < -0.1$$

further, the aspherical surface is generally expressed by:

$$S(y)=(y^2/R)/\{1+(1-ky^2/R^2)^{1/2}\}+C_2 xy^2+C_4 xy^4+C_6 xy^6+C_8 xy^8+C_{10} xy^{10}+$$

where y is the height in a direction perpendicular to the optical axis, S(y) is the quantity of shift in the optical-axis direction at the height y, r is the fiducial radius of curvature, k is the conical coefficient, and $C_n$ is the nth-order aspherical surface coefficient, and, when the paraxial curvature radius r of this surface is defined such as:

$$r=1/(2 \times C_2+1/R)$$

the following is given:

$r_1$: the curvature radius of an object-side surface of said first lens unit, $r_2$: the paraxial curvature radius of an eye-point-side surface of said first lens unit, $r_3$: the paraxial curvature radius of an object-side surface of a lens, disposed on the object side, of said second lens unit, $r_4$: the curvature radius of an eye-point-side surface of the lens, disposed on the object side, of said second lens unit, $r_9$: the paraxial curvature radius of an object-side surface of said fourth lens unit, and $r_{10}$: the curvature of radius of an eye-point-side surface of said fourth lens unit.

18. The Keplerian zoom finder optical system according to claim 15, wherein said second lens unit has a positive lens with an aspherical surface on its closest-to-the-object side, said fourth lens unit has a positive lens with an aspherical surface on the object side, and said finder satisfies the following conditions:

$$-2 < r_2/r_1 < -0.5$$

$$-2 < r_3/r_4 < -0.4$$

$$-0.6 < r_9/r_{10} < -0.1$$

further, the aspherical surface is generally expressed by:

$$S(y)=(y^2/R)/\{1+(1-ky^2/R^2)^{1/2}\}+C_2 xy^2+C_4 xy^4+C_6 xy^6+C_8 xy^8+C_{10} xy^{10}+$$

where y is the height in a direction perpendicular to the optical axis, S(y) is the quantity of shift in the optical-axis direction at the height y, r is the fiducial radius of curvature, k is the conical coefficient, and $C_n$ is the nth-order aspherical surface coefficient, and, when the paraxial curvature radius r of this surface is defined such as:

$$r=1/(2 \times C_2+1/R)$$

the following is given:

$r_1$: the curvature radius of an object-side surface of said first lens unit, $r_2$: the paraxial curvature radius of an eye-point-side surface of said first lens unit, $r_3$: the paraxial curvature radius of an object-side surface of a lens, disposed on the object side, of said second lens unit, $r_4$: the curvature radius of an eye-point-side surface of the lens, disposed on the object side, of said second lens unit, $r_9$: the paraxial curvature radius of an object-side surface of said fourth lens unit, and $r_{10}$: the curvature of radius of an eye-point-side surface of said fourth lens unit.

19. A Keplerian zoom finder optical system comprising:

an objective lens group having a positive refracting power on the whole and constructed of, in order from an object side, a first lens unit of a biconcave negative lens having an aspherical surface on the object side, a second lens unit of a biconvex positive lens having an aspherical surface on the object side, a third lens unit having a negative refracting power and a fourth lens unit of a biconvex positive lens, a regulating unit, disposed in the vicinity of a focal position of said objective lens group, which regulates a visual field; and an eyepiece unit having a positive refracting power, wherein a magnification of said Keplerian zoom finder optical system varies when at least said second lens unit moves along an optical axis, and said finder satisfies the following conditions:

$$-2 < r_{12}/r_{11} < -1.1$$

$$-1.5 < r_{13}/r_{14} < -1$$

herein, the aspherical surface is generally expressed by:

$$S(y) = (y^2/R)/\{1+(1-k \times y^2/R^2)^{1/2}\} + C_2 \times y^2 + C_4 \times y^4 + C_6 \times y^6 + C_8 \times y^8 + C_{10} \times y^{10} +$$

where y is the height in a direction perpendicular to the optical axis, S(y) is the quantity of shift in the optical-axis direction at the height y, r is the fiducial radius of curvature, k is the conical coefficient, and $C_n$ is the nth-order aspherical surface coefficient, and, when the paraxial curvature radius r of this surface is defined such as:

$$r = 1/(2 \times C_2 + 1/R)$$

the following is given:

$r_{11}$: the paraxial curvature radius of an object-side surface of said first lens unit, $r_{12}$: the curvature radius of an eye-point-side surface of said first lens unit, $r_{13}$: the paraxial curvature radius of an object-side surface of said second lens unit, and $r_{14}$: the curvature radius of an eye-point-side surface of said second lens unit.

20. The Keplerian zoom finder optical system according to claim 19, wherein said finder satisfies the following conditions:

$$-5 < f_3/f_w < -3$$

$$0.1 < D_4/f_e < 0.3$$

where $f_w$: the synthetic focal length of said first and second lens units in the minimum magnification state, $f_3$: the focal length of said third lens unit, $f_e$: the focal length of said eyepiece unit, and $D_4$: the distance on the optical axis from an eye-point-side surface of said fourth lens unit to the regulating unit.

21. The Keplerian zoom finder optical system according to claim 20, wherein said first and second lens units in said objective lens group are moved along the optical axis to vary the magnification of said Keplerian zoom finder optical system.

22. The Keplerian zoom finder optical system according to claim 21, wherein said finder further satisfies the following conditions:

$$-1.4 < f_1/f_w < -1.2$$

$$-0.8 < f_2/f_1 < -0.6$$

$$-0.5 < f_4/f_3 < -0.44$$

where $f_1$: the focal length of said first lens unit, $f_2$: the focal length of said second lens unit, and $f_4$: the focal length of said fourth lens unit.

23. The Keplerian zoom finder optical system according to claim 20, said regulating unit being a reticle plate having a flat surface, further comprising:

a first mirror disposed in an air spacing between said third lens unit and said fourth lens unit;

a prism having two reflecting surfaces and disposed between said reticle plate and said eyepiece unit or disposed in said eyepiece unit; and a second mirror disposed in an air spacing between said prism and said reticle plate, wherein a finder image of said Keplerian zoom finder optical system is erected by said first and second mirrors in combination with the two reflecting surfaces.

24. The Keplerian zoom finder optical system according to claim 23, wherein said finder satisfies the following conditions:

$$1.0 < D_3/f_w < 1.4$$

$$0.1 < D_4/f_e < 0.3$$

$$0.3 < D_e/f_e < 0.5$$

where $D_3$: the distance on the optical axis from the eye-point-side surface of said third lens unit to the object-side surface of said fourth lens unit in the minimum magnification state, $D_4$: the distance on the optical axis from the eye-point-side surface of said fourth lens unit to the object-side surface of said reticle plate, and $D_e$: the distance on the optical axis from an eye-point-side surface of said reticle plate to a plane of incidence of said prism.

25. A Keplerian zoom finder optical system according to claim 19, wherein at least said second lens unit is moved so that when varying the magnification from low to high, said Keplerian zoom finder optical system reduces a distance between said first lens unit and said second lens unit and increases a distance between said second lens unit and said third lens unit, and wherein said fourth lens unit is fixed in varying the magnification.

26. A Keplerian zoom finder optical system comprising:

an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power;

a reticle disposed in the vicinity of a focal position of said objective lens group; and an eyepiece unit having a positive refracting power, wherein said Keplerian zoom finder optical system is a finder for varying a magnification by moving at least said second lens unit along an optical axis and satisfies the following condition:

$$0.1 < D_4/f_e < 0.3$$

where $f_e$: the focal length of said eyepiece unit, and $D_4$: the distance on the optical axis from the eye-point side surface of said fourth lens unit to the object-side surface of said reticle;

wherein at least said second lens unit is moved so that when varying the magnification from low to high, said finder reduces a distance between said first lens unit and said second lens unit and increases a distance between said second lens unit and said third lens unit, and wherein said fourth lens unit is fixed in varying the magnification.

27. A Keplerian zoom finder optical system comprising:

an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power;

a field frame disposed in the vicinity of a focal position of said objective lens group; and an eyepiece unit having a positive refracting power, wherein said Keplerian zoom finder optical system is a finder for varying a magnification by moving at least said second lens unit along an optical axis and satisfies the following condition:

$$0.1 < D_4/f_e < 0.3$$

where $f_e$: the focal length of said eyepiece unit, and $D_4$: the distance on the optical axis from the eye-point-side surface of said fourth lens unit to said field frame;

wherein at least said second lens unit is moved so that when varying the magnification from low to high, said finder reduces a distance between said first lens unit and said second lens unit and increases a distance between said second lens unit and said third lens unit, and wherein said fourth lens unit is fixed in varying the magnification.

28. A Keplerian zoom finder optical system comprising:

an objective lens group having a positive refracting power on the whole and constructed of, in order from an object side, a first lens unit having a negative refracting power, a second lens unit having a positive refracting power, a third lens unit having a negative refracting power and a fourth lens unit having a positive refracting power;

a regulating unit, disposed in the vicinity of a focal position of said objective lens group, which regulates a visual field; and an eyepiece unit having a positive refracting power, wherein said Keplerian zoom finder optical system is a finder for varying a magnification by moving at least said second lens unit along an optical axis and by varying the distances between said second lens unit and lens units at opposite sides of said second lens unit, and at least one surface of said second lens unit and one surface of said fourth lens unit are aspherical surfaces each having a curvature radius which increases as it approaches the periphery thereof, wherein at least said second lens unit is moved so that when varying the magnification from low to high, said finder reduces a distance between said first lens unit and said second lens unit and increases a distance between said second lens unit and said third lens unit, and wherein said fourth lens unit is fixed in varying the magnification.

* * * * *